US010902858B2

(12) United States Patent
Chebiyyam et al.

(10) Patent No.: US 10,902,858 B2
(45) Date of Patent: *Jan. 26, 2021

(54) AUDIO DECODING USING INTERMEDIATE SAMPLING RATE

(71) Applicant: QUALCOMM Incorporated, San Diego, CA (US)

(72) Inventors: Venkata Subrahmanyam Chandra Sekhar Chebiyyam, Seattle, WA (US); Venkatraman Atti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,744

(22) Filed: Feb. 20, 2019

(65) Prior Publication Data

US 2019/0180761 A1 Jun. 13, 2019

Related U.S. Application Data

(63) Continuation of application No. 15/620,685, filed on Jun. 12, 2017, now Pat. No. 10,249,307.

(Continued)

(51) Int. Cl.

*G06F 17/00* (2019.01)
*G10L 19/008* (2013.01)

(Continued)

(52) U.S. Cl.

CPC .......... *G10L 19/008* (2013.01); *G10L 19/022* (2013.01); *G10L 19/26* (2013.01);

(Continued)

(58) Field of Classification Search

CPC ..... G10L 19/008; G10L 19/022; G10L 19/26; G10L 21/038; G10L 19/24; H04S 3/008; H04S 2420/03

(Continued)

(56) References Cited

U.S. PATENT DOCUMENTS

| | | | | |
|---|---|---|---|---|
| 10,249,307 B2 * | 4/2019 | Chebiyyam | G10L 19/008 | |
| 2016/0055855 A1 * | 2/2016 | Kjoerling | G10L 19/008 | 704/500 |

(Continued)

FOREIGN PATENT DOCUMENTS

| | | |
|---|---|---|
| TW | 201517019 A | 5/2015 |
| TW | 201610986 A | 3/2016 |
| TW | 201618082 A | 5/2016 |

OTHER PUBLICATIONS

Disch S., et al., "3DA Phase 2 Core Experiment on Optimizations and Improvements for Low Bitrate Coding," 112, Mpeg Meeting; Jun. 22, 2015- Jun. 26, 2015; Warsaw; (Motion Picture Expert Group or ISO/IEC JTC1/SC29/WG11),, No. m36530, Jun. 18, 2015 (Jun. 18, 2015), XP030064898, 36 Pages.

(Continued)

*Primary Examiner* — Ammar T Hamid

(57) ABSTRACT

An apparatus includes a decoder configured to receive, from an encoder, a frame associated with an audio bitstream and with a first sampling rate. The decoder is configured to perform a frequency-domain upmix on data associated with the frame to generate left and right frequency-domain signals and is further configured to generate, based on the left and right frequency-domain signals, left and right time-domain signals that each have a second sampling rate. The second sampling rate is determined by the decoder, based on one or both of the first sampling rate and an output sampling rate, and is adjustable by the decoder to enable different frames to be decoded at different second sampling rates. The (Continued)

decoder is further configured to generate, based on the left and right time-domain signals, left and right resampled signals that each have the output sampling rate.

30 Claims, 14 Drawing Sheets

Related U.S. Application Data

(60) Provisional application No. 62/355,138, filed on Jun. 27, 2016.

(51) Int. Cl.

| | |
|---|---|
| ***G10L 19/26*** | (2013.01) |
| ***G10L 21/038*** | (2013.01) |
| ***G10L 19/022*** | (2013.01) |
| ***H04S 3/00*** | (2006.01) |
| *G10L 19/24* | (2013.01) |

(52) U.S. Cl.
CPC ............ *G10L 21/038* (2013.01); *H04S 3/008* (2013.01); *G10L 19/24* (2013.01); *H04S 2420/03* (2013.01)

(58) Field of Classification Search
USPC .................................. 381/22, 58; 700/94, 90
See application file for complete search history.

(56) References Cited

U.S. PATENT DOCUMENTS

| | | | |
|---|---|---|---|
| 2016/0055864 | A1 | 2/2016 | Purnhagen et al. |
| 2016/0133273 | A1 | 5/2016 | Kaniewska et al. |
| 2017/0372708 | A1 | 12/2017 | Chebiyyam |

OTHER PUBLICATIONS

International Search Report and Written Opinion—PCT/US2017/037190—ISA/EPO—dated Jul. 26, 2017.
Taiwan Search Report—TW106120986—TIPO—dated Aug. 31, 2020.

* cited by examiner

AUDIO DECODING USING INTERMEDIATE SAMPLING RATE

I. CROSS-REFERENCE TO RELATED APPLICATIONS

This application claims priority from and is a continuation application of U.S. patent application Ser. No. 15/620,685, entitled "AUDIO DECODING USING INTERMEDIATE SAMPLING RATE," filed Jun. 12, 2017, now U.S. Pat. No. 10,249,307, which claims the benefit of priority from U.S. Provisional Patent Application No. 62/355,138, filed Jun. 27, 2016, entitled "AUDIO DECODING USING INTERMEDIATE SAMPLING RATE," the contents of each of which is incorporated by reference in its entirety.

II. FIELD

The present disclosure is generally related to audio decoding.

III. DESCRIPTION OF RELATED ART

A computing device may include a decoder to decode and process encoded audio signals. For example, the decoder may receive encoded audio signals from an encoder. The encoded audio signals may be encoded at different sampling rates. To illustrate, a first encoded signal (e.g., a Wideband signal) may be encoded at a 16 kHz sampling rate, a second encoded signal (e.g., a Super-Wideband signal) may be encoded at a 32 kHz sampling rate, a third encoded signal (e.g., a Full-band signal) may be encoded at a 40 kHz sampling rate, and a fourth encoded signal (e.g., a Super-Wideband signal) may be encoded at a 48 kHz sampling rate. During decoding operations, the decoder may resample each encoded signal to an output sampling rate of the decoder. As a non-limiting example, the decoder may resample each encoded signal to a 48 kHz sampling rate.

However, during decoding operations, the decoder may separately resample a core (e.g., a low-band) of each encoded signal at the output sampling rate and separately resample a high-band of each encoded signal at the output sampling rate. After the core and the high-band are resampled at the output sampling rate, some post-processing may be carried out on the resampled core and the high-band signals at the output sampling rate. The resulting signals may be combined and provided to additional circuitry for processing operations. Resampling the core and the high-band separately and unnecessarily performing the post-processing at the output sampling rate results in relatively long signal processing times.

IV. SUMMARY

According to one implementation, an apparatus comprises a decoder configured to receive a frame of an audio bitstream from a receiver. The frame is associated with a first sampling rate, and the decoder is configured to perform a frequency-domain upmix on data associated with the frame to generate left and right frequency-domain signals. The decoder is further configured to generate, based on the left and right frequency-domain signals, left and right time-domain signals having a second sampling rate, where the second sampling rate is determined by the decoder based on one or both of the first sampling rate and an output sampling rate and is adjustable by the decoder to enable different frames to be decoded at different second sampling rates. The decoder further is configured to generate, based on the left and right time-domain signals, left and right resampled signals that each have the output sampling rate.

According to another implementation, a method for processing a signal at a decoder comprises receiving a frame of an audio bitstream from a receiver, the frame associated with a first sampling rate, performing a frequency-domain upmix on data associated with the frame to generate left and right frequency-domain signals, and based on the left and right frequency-domain signals, generating left and right time-domain signals having a second sampling rate. The method further comprises generating, based on the left and right time-domain signals, left and right resampled signals that each have the output sampling rate.

According to another implementation, a non-transitory computer-readable medium comprises instructions for processing a signal. The instructions, when executed by a processor within a decoder, cause the processor to perform operations comprising receiving a frame of an audio bitstream from a receiver, the frame associated with a first sampling rate, performing a frequency-domain upmix on data associated with the frame to generate left and right frequency-domain signals, and based on the left and right frequency-domain signals, generating left and right time-domain signals having a second sampling rate. The operations further comprise generating, based on the left and right time-domain signals, left and right resampled signals that each have the output sampling rate.

According to another implementation, an apparatus includes a receiver that is configured to receive a first frame of a mid channel audio bitstream from an encoder. The apparatus also includes a decoder configured to determine a first bandwidth of the first frame based on first coding information associated with the first frame. The first coding information indicates a first coding mode used by the encoder to encode the first frame. The first bandwidth is based on the first coding mode. The decoder is also configured to determine an intermediate sampling rate based on a Nyquist sampling rate of the first bandwidth. The decoder is also configured to decode an encoded mid channel of the first frame to generate a decoded mid channel. The decoder is also configured to perform a frequency-domain upmix operation on the decoded mid channel to generate a left frequency-domain low-band signal and a right frequency-domain low-band signal. The decoder is also configured to perform a frequency-to-time domain conversion operation on the left frequency-domain low-band signal to generate a left time-domain low-band signal having the intermediate sampling rate. The decoder is also configured to perform a frequency-to-time domain conversion operation on the right frequency-domain low-band signal to generate a right time-domain low-band signal having the intermediate sampling rate. The decoder is also configured to generate, based at least on the encoded mid channel, a left time-domain high-band signal having the intermediate sampling rate and a right time-domain high-band signal having the intermediate sampling rate. The decoder is also configured to generate a left signal based at least on combining the left time-domain low-band signal and the left time-domain high-band signal. The decoder is also configured to generate a right signal based at least on combining the right time-domain low-band signal and the right time-domain high-band signal. The decoder is also configured to generate a left resampled signal having an output sampling rate of the decoder and a right resampled signal having the output sampling rate. The left resampled signal is based at least in part on the left signal, and the right resampled signal is based at least in part on the right signal.

According to another implementation, a method for processing a signal includes receiving, at a decoder, a first frame of a mid channel audio bitstream from an encoder. The method also includes determining a first bandwidth of the first frame based on first coding information associated with the first frame. The first coding information indicates a first coding mode used by the encoder to encode the first frame. The first bandwidth is based on the first coding mode. The method also includes determining an intermediate sampling rate based on a Nyquist sampling rate of the first bandwidth. The method also includes decoding an encoded mid channel of the first frame to generate a decoded mid channel. The method also includes performing a frequency-domain upmix operation on the decoded mid channel to generate a left frequency-domain low-band signal and a right frequency-domain low-band signal. The method also includes performing a frequency-to-time domain conversion operation on the left frequency-domain low-band signal to generate a left time-domain low-band signal having the intermediate sampling rate. The method also includes performing a frequency-to-time domain conversion operation on the right frequency-domain low-band signal to generate a right time-domain low-band signal having the intermediate sampling rate. The method also includes generating, based at least on the encoded mid channel, a left time-domain high-band signal having the intermediate sampling rate and a right time-domain high-band signal having the intermediate sampling rate. The method also includes generating a left signal based at least on combining the left time-domain low-band signal and the left time-domain high-band signal. The method also includes generating a right signal based at least on combining the right time-domain low-band signal and the right time-domain high-band signal. The method also includes generating a left resampled signal having an output sampling rate of the decoder and a right resampled signal having the output sampling rate. The left resampled signal is based at least in part on the left signal, and the right resampled signal is based at least in part on the right signal.

According to another implementation, a non-transitory computer-readable medium includes instructions for processing a signal. The instructions, when executed by a processor within a decoder, cause the processor to perform operations including receiving a first frame of a mid channel audio bitstream from an encoder. The operations also include determining a first bandwidth of the first frame based on first coding information associated with the first frame. The first coding information indicates a first coding mode used by the encoder to encode the first frame. The first bandwidth is based on the first coding mode. The operations also include determining an intermediate sampling rate based on a Nyquist sampling rate of the first bandwidth. The operations also include decoding an encoded mid channel of the first frame to generate a decoded mid channel. The method also includes performing a frequency-domain upmix operation on the decoded mid channel to generate a left frequency-domain low-band signal and a right frequency-domain low-band signal. The operations also include performing a frequency-to-time domain conversion operation on the left frequency-domain low-band signal to generate a left time-domain low-band signal having the intermediate sampling rate. The operations also include performing a frequency-to-time domain conversion operation on the right frequency-domain low-band signal to generate a right time-domain low-band signal having the intermediate sampling rate. The operations also include generating, based at least on the encoded mid channel, a left time-domain high-band signal having the intermediate sampling rate and a right time-domain high-band signal having the intermediate sampling rate. The operations also include generating a left signal based at least on combining the left time-domain low-band signal and the left time-domain high-band signal. The operations also include generating a right signal based at least on combining the right time-domain low-band signal and the right time-domain high-band signal. The operations also include generating a left resampled signal having an output sampling rate of the decoder and a right resampled signal having the output sampling rate. The left resampled signal is based at least in part on the left signal, and the right resampled signal is based at least in part on the right signal.

According to another implementation, an apparatus includes means for receiving a first frame of a mid channel audio bitstream from an encoder. The apparatus also includes means for determining a first bandwidth of the first frame based on first coding information associated with the first frame. The first coding information indicates a first coding mode used by the encoder to encode the first frame. The first bandwidth is based on the first coding mode. The apparatus also includes means for determining an intermediate sampling rate based on a Nyquist sampling rate of the first bandwidth. The apparatus also includes means for decoding an encoded mid channel of the first frame to generate a decoded mid channel. The apparatus also includes means for performing a frequency-domain upmix operation on the decoded mid channel to generate a left frequency-domain low-band signal and a right frequency-domain low-band signal. The apparatus also includes means for performing a frequency-to-time domain conversion operation on the left frequency-domain low-band signal to generate a left time-domain low-band signal having the intermediate sampling rate. The apparatus also includes means for performing a frequency-to-time domain conversion operation on the right frequency-domain low-band signal to generate a right time-domain low-band signal having the intermediate sampling rate. The apparatus also includes means for generating, based at least on the encoded mid channel, a left time-domain high-band signal having the intermediate sampling rate and a right time-domain high-band signal having the intermediate sampling rate. The apparatus also includes means for generating a left signal based at least on combining the left time-domain low-band signal and the left time-domain high-band signal. The apparatus also includes means for generating a right signal based at least on combining the right time-domain low-band signal and the right time-domain high-band signal. The apparatus also includes means for generating a left resampled signal having an output sampling rate of the decoder and a right resampled signal having the output sampling rate. The left resampled signal is based at least in part on the left signal, and the right resampled signal is based at least in part on the right signal.

According to another implementation, a method for processing a signal includes receiving a first frame of an input audio bitstream at a decoder. The first frame includes at least one signal associated with a frequency range. The method also includes decoding the at least one signal to generate at least one decoded signal having an intermediate sampling rate. The intermediate sampling rate is based on coding information associated with the first frame. The method further includes generating a resampled signal based at least in part on the at least one decoded signal. The resampled signal has an output sampling rate of the decoder.

According to another implementation, an apparatus for processing a signal includes a demultiplexer configured to receive a first frame of an input audio bitstream at a decoder. The first frame includes at least one signal associated with a frequency range. The apparatus also includes at least one decoder configured to decode the at least one signal to generate at least one decoded signal having an intermediate sampling rate. The intermediate sampling rate is based on coding information associated with the first frame. The apparatus further includes a sampler configured to generate a resampled signal based at least in part on the at least one decoded signal. The resampled signal has an output sampling rate of the decoder.

According to another implementation, a non-transitory computer-readable medium includes instructions for processing a signal. The instructions, when executed by a processor within a decoder, cause the processor to perform operations including receiving a first frame of an input audio bitstream at a decoder. The first frame includes at least one signal associated with a frequency range. The operations also include decoding the at least one signal to generate at least one decoded signal having an intermediate sampling rate. The intermediate sampling rate is based on coding information associated with the first frame. The operations further include generating a resampled signal based at least in part on the at least one decoded signal. The resampled signal has an output sampling rate of the decoder.

According to an alternative implementation, a method for processing a signal includes receiving a first frame of an input audio bitstream at a decoder. The first frame includes at least one signal associated with a frequency range. The method also includes determining a per band intermediate sampling rate associated with each of the at least one of the signal. Each per band intermediate sampling rate associated with the at least one signal is less than or equal to a single intermediate sampling rate determined based on coding information associated with the first frame. The method also includes decoding the at least one signal to generate at least one decoded signal having the corresponding per band intermediate sampling rate. The method further includes generating a resampled signal based at least in part on the at least one decoded signal. The resampled signal has an output sampling rate of the decoder.

According to another implementation, a method for processing a signal includes receiving a first frame of an input audio bitstream at a decoder. The first frame includes at least a low-band signal associated with a first frequency range and a high-band signal associated with a second frequency range. The method also includes decoding the low-band signal to generate a decoded low-band signal having an intermediate sampling rate. The intermediate sampling rate is based on coding information associated with the first frame. The method further includes decoding the high-band signal to generate a decoded high-band signal having the intermediate sampling rate. The method also includes combining at least the decoded low-band signal and the decoded high-band signal to generate a combined signal having the intermediate sampling rate. The method further includes generating a resampled signal based at least in part on the combined signal. The resampled signal is sampled at an output sampling rate of the decoder.

According to another implementation, an apparatus for processing a signal includes a demultiplexer configured to receive a first frame of an input audio bitstream at a decoder. The first frame includes at least a low-band signal associated with a first frequency range and a high-band signal associated with a second frequency range. The apparatus also includes a low-band decoder configured to decode the low-band signal to generate a decoded low-band signal having an intermediate sampling rate. The intermediate sampling rate is based on coding information associated with the first frame. The apparatus further includes a high-band decoder configured to decode the high-band signal to generate a decoded high-band signal having the intermediate sampling rate. The apparatus also includes an adder configured to combine at least the decoded low-band signal and the decoded high-band signal to generate a combined signal having the intermediate sampling rate. The apparatus further includes a sampler configured to generate a resampled signal based at least in part on the combined signal. The resampled signal is sampled at an output sampling rate of the decoder.

According to another implementation, a non-transitory computer-readable medium includes instructions for processing a signal. The instructions, when executed by a processor within a decoder, cause the processor to perform operations including receiving a first frame of an input audio bitstream. The first frame includes at least a low-band signal associated with a first frequency range and a high-band signal associated with a second frequency range. The operations also include decoding the low-band signal to generate a decoded low-band signal having an intermediate sampling rate. The intermediate sampling rate is based on coding information associated with the first frame. The operations further include decoding the high-band signal to generate a decoded high-band signal having the intermediate sampling rate. The operations also include combining at least the decoded low-band signal and the decoded high-band signal to generate a combined signal having the intermediate sampling rate. The operations further include generating a resampled signal based at least in part on the combined signal. The resampled signal is sampled at an output sampling rate of the decoder.

According to another implementation, an apparatus for processing a signal includes means for receiving a first frame of an input audio bitstream. The first frame includes at least a low-band signal associated with a first frequency range and a high-band signal associated with a second frequency range. The apparatus also includes means for decoding the low-band signal to generate a decoded low-band signal having an intermediate sampling rate. The intermediate sampling rate is based on coding information associated with the first frame. The apparatus further includes means for decoding the high-band signal to generate a decoded high-band signal having the intermediate sampling rate. The apparatus also includes means for combining at least the decoded low-band signal and the decoded high-band signal to generate a combined signal having the intermediate sampling rate. The apparatus further includes means for generating a resampled signal based at least in part on the combined signal. The resampled signal is sampled at an output sampling rate of a decoder.

V. BRIEF DESCRIPTION OF THE DRAWINGS

VI. DETAILED DESCRIPTION

Particular implementations of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where." As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

Figure 1:
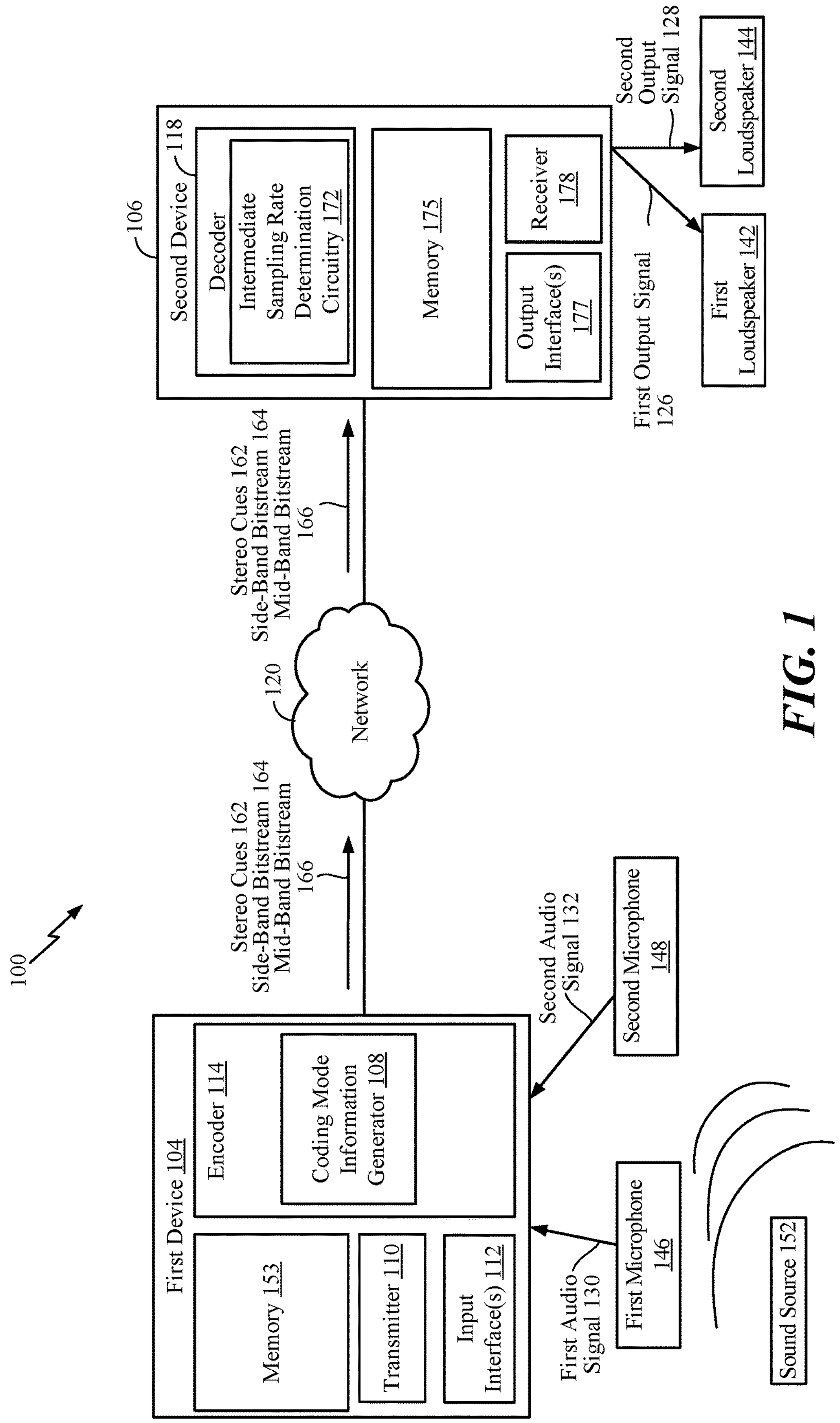
FIG. 1 depicts a system that includes a decoder operable to decode an audio frame using an intermediate sampling rate associated with a coding mode of the audio frame.

FIG. 1 depicts a particular illustrative example of a system 100 that includes a first device 104 communicatively coupled, via a network 120, to a second device 106. The network 120 may include one or more wireless networks, one or more wired networks, or a combination thereof.

The first device 104 includes an encoder 114, a transmitter 110, one or more input interfaces 112, or a combination thereof. A first input interface of the input interface(s) 112 may be coupled to a first microphone 146. A second input interface of the input interface(s) 112 may be coupled to a second microphone 148. The encoder 114 includes a coding mode information generator 108 that is operable to generate coding information, as described herein. The first device 104 may also include a memory 153.

The second device 106 includes a decoder 118, a memory 175, a receiver 178, one or more output interfaces 177, or a combination thereof. The receiver 178 of the second device 106 may receive an encoded audio signal (e.g., one or more bit streams), one or more parameters, or both from the first device 104 via the network 120. The decoder 118 includes intermediate sampling rate determination circuitry 172 that is operable to determine coding modes of different frames and to determine sampling rates (e.g., "intermediate sampling rates") associated with the coding modes. The decoder 118 may decode each frame using an intermediate sampling rate associated with the frame. For example, the decoder 118 may decode a core (e.g., a low-band) of each frame and a high-band of each frame using the intermediate sampling rate. After the core and the high-band are decoded, the decoder 118 may combine the resulting signals and resample the combined signal at an output sample rate of the decoder 118. Decoding operations using intermediate sampling rates are described in greater detail with respect to FIGS. 2-8.

During operation, the first device 104 may receive a first audio signal 130 via the first input interface from the first microphone 146 and may receive a second audio signal 132 via the second input interface from the second microphone 148. The first audio signal 130 may correspond to one of a right channel signal or a left channel signal. The second audio signal 132 may correspond to the other of the right channel signal or the left channel signal. In some implementations, a sound source 152 (e.g., a user, a speaker, ambient noise, a musical instrument, etc.) may be closer to the first microphone 146 than to the second microphone 148. Accordingly, an audio signal from the sound source 152 may be received at the input interface(s) 112 via the first microphone 146 at an earlier time than via the second microphone 148. This natural delay in the multi-channel signal acquisition through the multiple microphones may introduce a temporal shift between the first audio signal 130 and the second audio signal 132. In some implementations, the encoder 114 may be configured to adjust (e.g., shift) at least one of the first audio signal 130 or the second audio signal 132 to temporally align the first audio signal 130 and the second audio signal 132. For example, the encoder 114 may temporally shift or delay a first frame (of the first audio signal 130) with respect to a second frame (of the second audio signal 132).

The encoder 114 may transform the audio signals 130, 132 into frequency-domain signals. The frequency-domain signals may be used to estimate stereo cues 162. The stereo cues 162 may include parameters that enable rendering of spatial properties associated with left channels and right channels. According to some implementations, the stereo cues 162 may include parameters such as interchannel intensity difference (IID) parameters (e.g., interchannel level differences (ILDs), interchannel time difference (ITD) parameters, interchannel phase difference (IPD) parameters, interchannel correlation (ICC) parameters, non-causal shift parameters, spectral tilt parameters, inter-channel voicing parameters, inter-channel pitch parameters, inter-channel gain parameters, etc., as illustrative, non-limiting examples). The stereo cues 162 may also be transmitted as part of an encoded signal.

The encoder 114 may also generate a side-band bitstream 164 and a mid-band bitstream 166 based at least in part on the frequency-domain signals. The transmitter 110 may transmit the stereo cues 162, the side-band bitstream 164, the mid-band bitstream 166, or a combination thereof, via the network 120, to the second device 106. Alternatively, or in addition, the transmitter 110 may store the stereo cues 162, the side-band bitstream 164, the mid-band bitstream 166, or a combination thereof, at network device (e.g., a base station).

The decoder 118 may perform decoding operations based on the stereo cues 162, the side-band bitstream 164, and the mid-band bitstream 166. The decoder 118 may generate a first output signal 126 (e.g., corresponding to first audio signal 130), a second output signal 128 (e.g., corresponding to the second audio signal 132), or both. The second device 106 may output the first output signal 126 via the first loudspeaker 142. The second device 106 may output the second output signal 128 via the second loudspeaker 144. In alternative examples, the first output signal 126 and the second output signal 128 may be transmitted as a stereo signal pair to a single output loudspeaker.

Although the first device 104 and the second device 106 have been described as separate devices, in other implementations, the first device 104 may include one or more components described with reference to the second device 106. Additionally or alternatively, the second device 106 may include one or more components described with reference to the first device 104. For example, a single device may include the encoder 114, the decoder 118, the transmitter 110, the receiver 178, the one or more input interfaces 112, the one or more output interfaces 177, and a memory.

The system 100 may decode different audio frames at intermediate sampling rates that are based on sampling rates at which the audio frames are encoded (e.g., based on sampling rates associated with the coding modes of the frames). For example, if a particular audio frame is encoded at a 32 kHz sampling rate, the decoder 118 may decode a core of the particular audio frame at a 32 kHz sampling rate and may decode a high-band of the particular audio frame at a 32 kHz sampling rate. After the core and the high-band are decoded, the resulting signals may be combined and resampled to an output sampling rate of the decoder 118. Decoding the particular audio frame at the intermediate sampling rates (e.g., 32 kHz) as opposed to the output sampling rate of the decoder may reduce the amount of sampling and resampling operations, as further described with respect to FIGS. 2-8.

Figure 2:
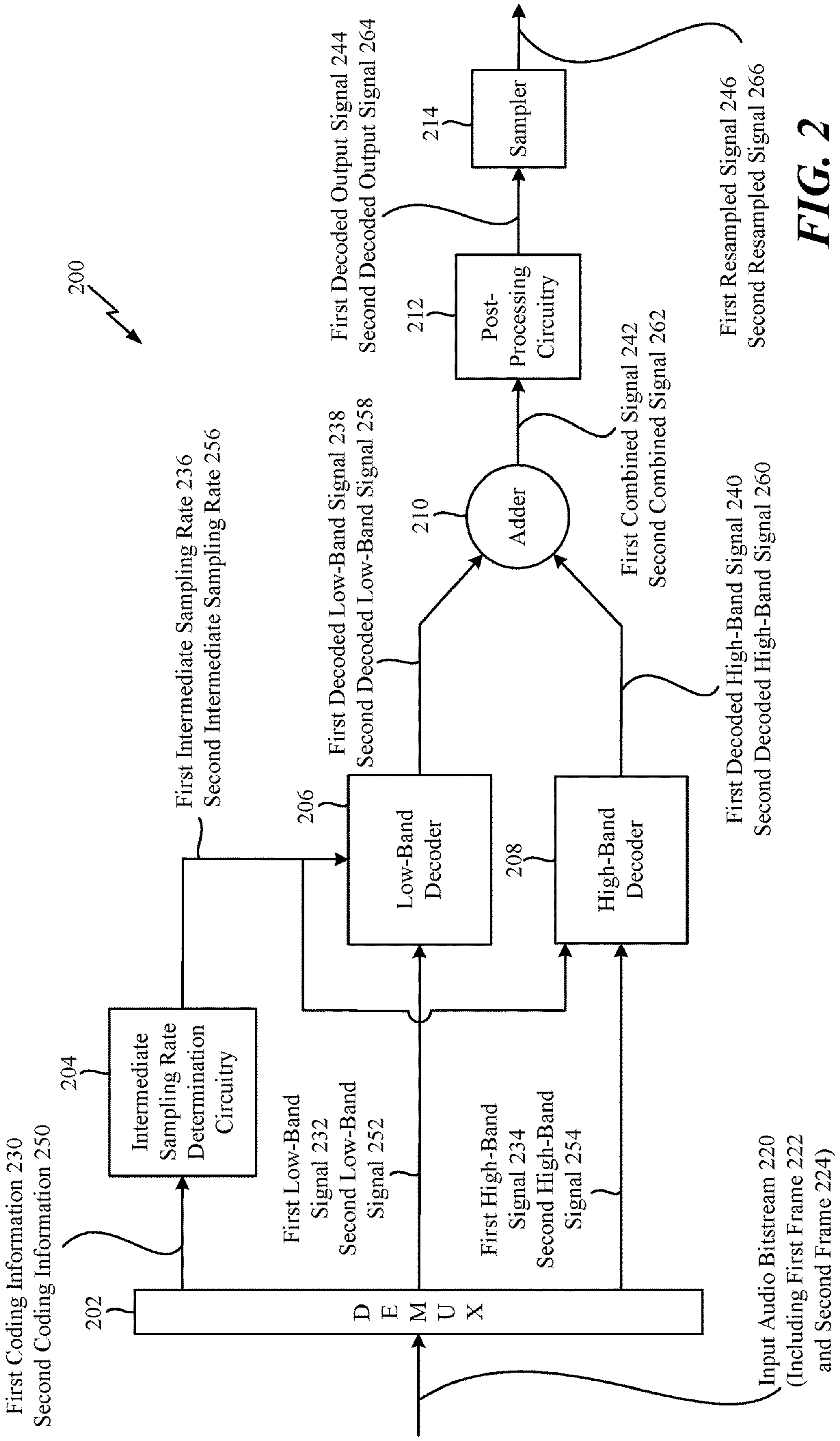
FIG. 2 depicts a decoding system operable to decode an audio frame using an intermediate sampling rate associated with a coding mode of the audio frame.

Referring to FIG. 2, a system 200 for processing an audio signal is shown. The system 200 may be a decoding system (e.g., an audio decoder). For example, the system 200 may correspond to the decoder 118 of FIG. 1.

The system 200 includes a demultiplexer (DEMUX) 202, intermediate sampling rate determination circuitry 204, a low-band decoder 206, a high-band decoder 208, an adder 210, post-processing circuitry 212, and a sampler 214. The intermediate sampling rate determination circuitry 204 may correspond to the intermediate sampling rate determination circuitry 172 of FIG. 1. According to other implementations, the system 200 may include additional (or fewer) circuit components. As a non-limiting example, according to another implementation, the system 200 may include a side channel decoder (not shown). All the techniques described may also be applied to the side channel decoding process where useful and applicable.

The demultiplexer 202 may be configured to receive an input audio bitstream 220 that is transmitted from an encoder (not shown). According to one implementation, the input audio bitstream 220 may correspond to the mid-band bitstream 166 of FIG. 1. The input audio bitstream 220 may include a plurality of frames. For example, the input audio bitstream 220 may include speech frames and non-speech frames. In FIG. 2, the input audio bitstream 220 includes a first frame 222 and a second frame 224. The first frame 222 may be received by the demultiplexer 202 at a first time (T1), and the second frame 224 may be received by the demultiplexer 202 at a second time (T2) that is after the first time (T1).

According to one implementation, different frames in the input audio bitstream 220 may be encoded using different coding modes. As non-limiting examples, particular frames of the input audio bitstream 220 may be encoded according to a Wideband (WB) coding mode, other frames of the input audio bitstream 220 may be encoded according to a Super-Wideband (SWB) coding mode, and other frames of the input audio bitstream 220 may be encoded according to a Full-band (FB) coding mode. An encoder (not shown) may encode a frame using a Wideband coding mode if the frame includes content from approximately 0 Hertz (Hz) to 8 kilohertz (kHz). A low-band portion of the frame that is encoded according to the Wideband coding mode may span from approximately 0 Hz to 4 kHz, and a high-band portion of the frame that is encoded according to the Wideband coding mode may span from approximately 4 kHz to 8 kHz. The encoder may encode a frame using a Super-Wideband coding mode if the frame includes content from approximately 0 Hz to 16 kHz. A low-band portion of the frame that is encoded according to the Super-Wideband coding mode may span from approximately 0 Hz to 8 kHz, and a high-band portion of the frame that is encoded according to the Super-Wideband coding mode may span from approximately 8 kHz to 16 kHz. The encoder may encode a frame using a Full-band coding mode if the frame includes content from approximately 0 Hz to 20 kHz. A low-band portion of the frame that is encoded according to the Full-band coding mode may span from approximately 0 Hz to 8 kHz, a high-band portion of the frame that is encoded according to the Full-band coding mode may span from approximately 8 kHz to 16 kHz, and a full-band portion of the frame that is encoded according to the Full-band coding mode may span from approximately 16 kHz to 20 kHz.

It should be understood that the frequency ranges described above are for illustrative purposes and should not be construed as limiting. The high-band and low-band portions for each coding mode may vary in other implementations. In yet another implementation, a single band may span an entire bandwidth range. Thus, the techniques describe herein may not be limited to scenarios where signals include separate high-band and low-band portions. For ease of illustration, the first frame 222 may be encoded according to the Wideband coding mode, and the second frame 224 may be encoded according to the Super-Wideband coding mode. For example, the first frame 222 may include content from approximately 0 Hz to 8 kHz, and the second frame 224 may include content from approximately 0 Hz to 16 kHz. Although the description describes the first frame 222 as a Wideband frame and the second frame 224 as a Super-Wideband frame, the techniques described below may be applied to any combination of frame types.

Upon receiving the first and second frames 222, 224, the system 200 may be operable to decode the frames 222, 224 using an "intermediate sampling rate" and to generate decoded signals having an output sampling rate. For example, the system 200 may be operable to decode the frames 222, 224 to generate signals having an output sampling rate of the decoder. As used herein, the "intermediate sampling rate" may correspond to a sampling rate associated with the coding mode of a particular frame. According to one implementation, the intermediate sampling rate of a particular frame may correspond to the Nyquist sampling rate of the particular frame. For example, the intermediate sampling rate of a particular frame may be approximately equal to twice the bandwidth of the particular frame. As described below, the output sampling rate of the decoder is equal to 48 kHz. However, it should be understood that the output sampling rate is merely for illustrative purposes and the techniques may be applied to decoders having different output sampling rates or variable output sampling rates.

The following description describes decoding the first frame 222 (e.g., a Wideband frame) using the low-band decoder 206 and the high-band decoder 208. However, in certain implementations, the first frame 222 may be decoded using the low-band decoder 206 (and bypassing the high-band decoder 208). For example, because content of a Wideband frame ranges from approximately 0 Hz to 8 kHz, the low-band decoder 206 may have bandwidth capabilities to encode the entire first frame 222. In other implementations, as described below, the low-band decoder 206 and the high-band decoder 208 may be dynamically configurable to decode signals of varying frequency ranges based on the coding mode of an associated frame. In general, when the decoder has the capabilities to decode the entire bandwidth content, the HB decoder may not be relevant in that particular frame and the LB may correspond to the entire signal bandwidth.

To decode the first frame 222, the demultiplexer 202 may be configured to generate first coding information 230 associated with the first frame 222, a first low-band signal 232, and a first high-band signal 234. The first coding information 230 may be provided to the intermediate sampling rate determination circuitry 204, the first low-band signal 232 may be provided to the low-band decoder 206, and the first high-band signal 234 may be provided to the high-band decoder 208.

The intermediate sampling rate determination circuitry 204 may be configured to determine a first intermediate sampling rate 236 of the first frame 222 based on the first coding information 230. For example, the intermediate sampling rate determination circuitry 204 may determine a first bitrate of the first frame 222 based on the first coding information 230. The first bitrate may be based on a first bandwidth of the first frame 222. Thus, if the first frame 222 is a Wideband frame having a first bandwidth between of approximately 8 kHz (e.g., having content within a frequency range spanning from 0 Hz to 8 kHz), the first bitrate of the first frame 222 may be associated with a maximum sample rate of 16 kHz (e.g., the Nyquist sampling rate of a signal having an 8 kHz bandwidth). The intermediate sampling rate determination circuitry 204 may compare the first bitrate (e.g., a bitrate associated with a maximum sample rate of 16 kHz) to the output sampling rate (e.g., 48 kHz). The first intermediate sampling rate 236 may be based on the first bandwidth of the first frame 222 if the maximum sample rate associated with the first bitrate is less than the output sampling rate.

The intermediate sampling rate determination circuitry 204 may also use alternate, but substantially equivalent, measures to determine the first intermediate sampling rate 236. For example, the intermediate sampling rate determination circuitry 204 may determine the first bandwidth of the first frame 222 based on the first coding information 230. The intermediate sampling rate determination circuitry 204 may compare the output sampling rate to a product of two and the first bandwidth. The intermediate sampling rate determination circuitry 204 may select the product as the first intermediate sampling rate 236 if the product is less than the output sampling rate, and the intermediate sampling rate determination circuitry 204 may select the output sampling rate as the first intermediate sampling rate 236 if the output sampling rate is less than the product.

For simplicity of description, the first intermediate sampling rate 236 is 16 kHz (e.g., the Nyquist sampling rate for a Wideband frame having an 8 kHz bandwidth). However, it should be understood that 16 kHz is merely an illustrative example and should not be construed as limiting. In other implementations, the first intermediate sampling rate 236 may vary. The first intermediate sampling rate 236 may be provided to the low-band decoder 206 and to the high-band decoder 208.

The low-band decoder 206 may be configured to decode the first low-band signal 232 to generate a first decoded low-band signal 238 having the first intermediate sampling rate 236, and the high-band decoder 208 may be configured to decode the first high-band signal 234 to generate a first decoded high-band signal 240 having the first intermediate sampling rate 236. Operations of the low-band decoder 206 and the high-band decoder 208 are described in greater detail with respect to FIGS. 3-4.

Figure 3:
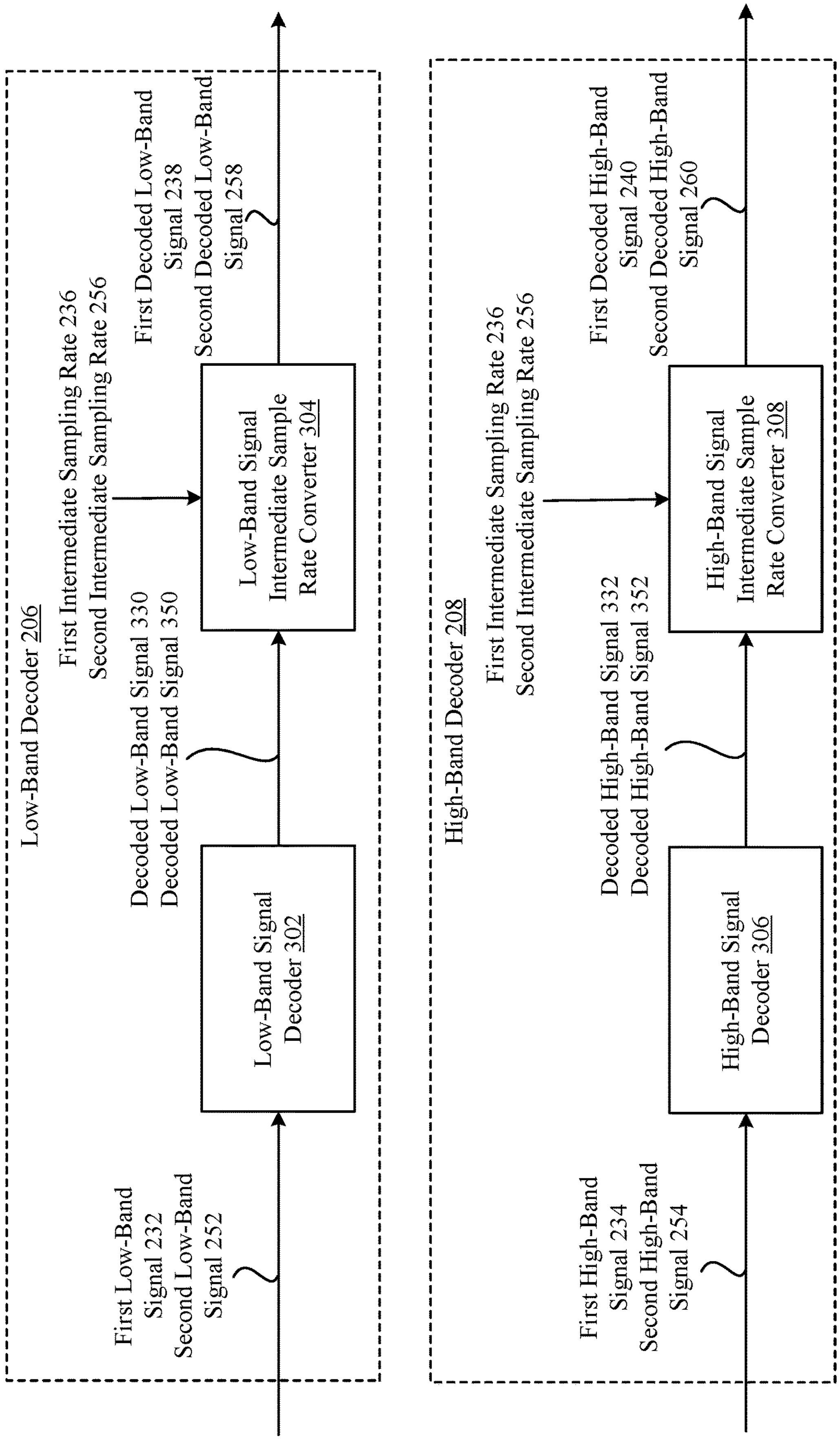
FIG. 3 depicts a low-band decoder operable to decode a low-band portion of an audio frame using an intermediate sampling rate associated with a coding mode of the audio frame and a high-band decoder operable to decode a high-band portion of the audio frame using the intermediate sampling rate.

Referring to FIG. 3, a diagram of the low-band decoder 206 and the high-band decoder 208 is shown. The low-band decoder 206 includes a low-band signal decoder 302 and a low-band signal intermediate sample rate converter 304. The high-band decoder 208 includes a high-band signal decoder 306 and a high-band signal intermediate sample rate converter 308.

Figure 4:
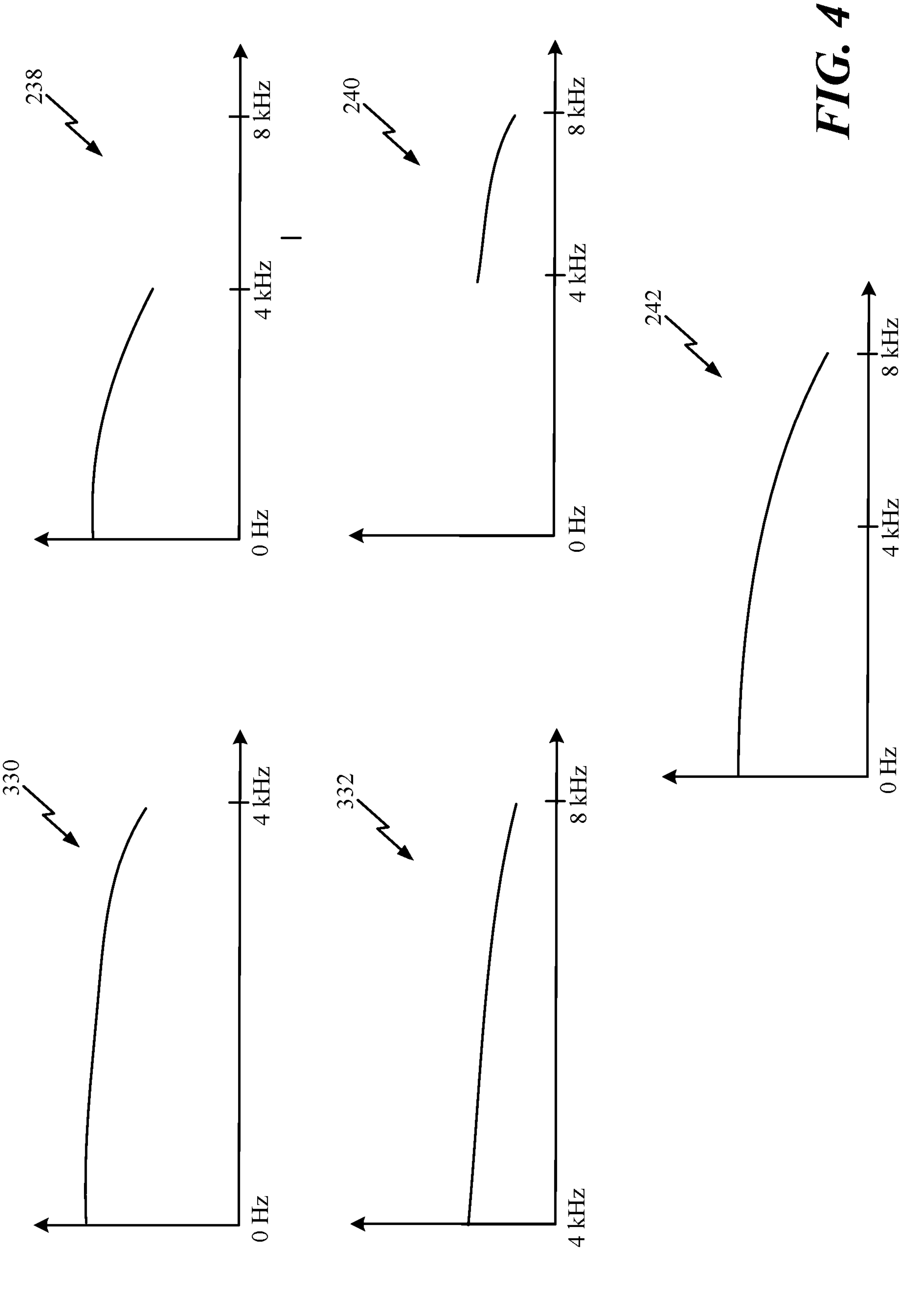
FIG. 4 illustrates signals associated with audio frames that are decoded using intermediate sampling rates.

The first low-band signal 232 may be provided to the low-band signal decoder 302. The low-band signal decoder 302 may decode the first low-band signal 232 to generate a decoded low-band signal 330. An illustration of the decoded low-band signal 330 is shown in FIG. 4. The decoded low-band signal 330 includes content spanning from approximately 0 Hz to 4 kHz (e.g., a low-band portion of a Wideband signal). The decoded low-band signal 330 and the first intermediate sampling rate 236 may be provided to the low-band signal intermediate sample rate converter 304. The low-band signal intermediate sample rate converter 304 may be configured to sample the decoded low-band signal 330 at the first intermediate sampling rate 236 (e.g., 16 kHz) to generate the first decoded low-band signal 238 having the first intermediate sampling rate 236. An illustration of the first decoded low-band signal 238 is shown in FIG. 4. The first decoded low-band signal 238 includes content spanning from approximately 0 Hz to 4 kHz and has the 16 kHz intermediate sampling rate (e.g., the Nyquist sampling rate for an 8 kHz bandwidth signal).

The first high-band signal 234 may be provided to the high-band signal decoder 306. The high-band signal decoder 306 may decode the first high-band signal 234 to generate a decoded high-band signal 332. An illustration of the decoded high-band signal 332 is shown in FIG. 4. The decoded high-band signal 332 includes content spanning from approximately 4 kHz to 8 kHz (e.g., a high-band portion of a Wideband signal). The decoded high-band signal 332 and the first intermediate sampling rate 236 may be provided to the high-band signal intermediate sample rate converter 308. The high-band signal intermediate sample rate converter 308 may be configured to sample the decoded high-band signal 332 at the first intermediate sampling rate 236 (e.g., 16 kHz) to generate the first decoded high-band signal 240 having the first intermediate sampling rate 236.

An illustration of the first decoded high-band signal 240 is shown in FIG. 4. The first decoded high-band signal 240 includes content spanning from approximately 4 kHz to 8 kHz and has the 16 kHz intermediate sampling rate (e.g., the Nyquist sampling rate for an 8 kHz bandwidth signal).

According to one implementation, when using a multi-band approach, the intermediate sample rate may not be used to decode the low-band and the high-band. Instead, Discrete Fourier Transform (DFT) analysis could be used. When DFT analysis is used, the low-band and the high-band may remain at the intermediate sample rate. An alternative implementation, the low-band may be sampled at the operating sample rate of the operating core (e.g., 16 kHz or 12.8 kHz), the high-band may be sampled at the intermediate sample rate, and the DFT analysis may be performed on the sampled signals. In another implementation, when a single band decoding is performed (e.g., a TCX/MDCT frame), the TCX/MDCT decoder may be configured to operate at the intermediate sample rate. Each of the above implementations may reduce complexity of the DFT analysis process. For example, performing a DFT analysis on signals at a lower sample rate may be less complex than performing a DFT analysis on signals at the output sample rate, post-processing signals, or both.

Referring back to FIG. 2, the low-band decoder 206 may provide the first decoded low-band signal 238 to the adder 210, and the high-band decoder 208 may provide the first decoded high-band signal 240 to the adder 210. The adder 210 may be configured to combine the first decoded low-band signal 238 and the first decoded high-band signal 240 to generate a first combined signal 242 having the first intermediate sampling rate 236. An illustration of the first combined signal 242 is shown in FIG. 4. The first combined signal 242 includes content spanning from approximately 0 Hz to 8 kHz (e.g., the first combined signal 242 is a Wideband signal), and the first combined signal 242 has the 16 kHz intermediate sampling rate (e.g., the Nyquist sampling rate). The first combined signal 242 may be provided to the post-processing circuitry 212.

The post-processing circuitry 212 may be configured to perform one or more processing operations on the first combined signal 242 to generate a first decoded output signal 244 having the first intermediate sampling rate 236. As a non-limiting example, the post-processing circuitry 212 may apply stereo cues, such as the stereo cues 162 of FIG. 1, to the first combined signal 242 to generate the first decoded output signal 244. In alternative implementations, the post-processing circuitry may also perform a stereo upmix as a part of the stereo cues application process. The first decoded output signal 244 may be provided to the sampler 214. The sampler 214 may be configured to generate a first resampled signal 246 having the output sampling rate (e.g., 48 kHz) based on the first decoded output signal 244. For example, the sampler 214 may be configured to sample the first decoded output signal 244 at the output sampling rate to generate the first resampled signal 246. Thus, the system 200 may process the first frame 222 at the first intermediate sampling rate 236 (e.g., the sampling rate at which the encoder encodes the first frame 222) and perform a single resampling operation at the output sampling rate (using the sampler 214) after the first frame 222 has been processed.

To decode the second frame 224, the demultiplexer 202 may be configured to generate second coding information 250 associated with the second frame 224, a second low-band signal 252, and a second high-band signal 254. The second coding information 250 may be provided to the intermediate sampling rate determination circuitry 204, the second low-band signal 252 may be provided to the low-band decoder 206, and the second high-band signal 254 may be provided to the high-band decoder 208.

The intermediate sampling rate determination circuitry 204 may be configured to determine a second intermediate sampling rate 256 of the second frame 224 based on the second coding information 250. For example, the intermediate sampling rate determination circuitry 204 may determine a second bitrate of the second frame 224 based on the second coding information 250. The second bitrate may be based on a second bandwidth of the second frame 224. Thus, if the second frame 224 is a Super-Wideband frame having a second bandwidth between of approximately 16 kHz (e.g., having content within a frequency range spanning from 0 Hz to 16 kHz), the second bitrate of the second frame 224 may be associated with a maximum sample rate of 32 kHz (e.g., the Nyquist sampling rate of a signal having a 16 kHz bandwidth). The intermediate sampling rate determination circuitry 204 may compare the second bitrate (e.g., a bitrate associated with a maximum sample rate of 32 kHz) to the output sampling rate (e.g., 48 kHz). The second intermediate sampling rate 256 may be based on the second bandwidth of the second frame 224 if the maximum sample rate associated with the second bitrate is less than the output sampling rate.

The intermediate sampling rate determination circuitry 204 may also use alternate, but substantially equivalent, measures to determine the second intermediate sampling rate 256. For example, the intermediate sampling rate determination circuitry 204 may determine the second bandwidth of the second frame 224 based on the second coding information 250. The intermediate sampling rate determination circuitry 204 may compare the output sampling rate to a product of two and the second bandwidth. The intermediate sampling rate determination circuitry 204 may select the product as the second intermediate sampling rate 256 if the product is less than the output sampling rate, and the intermediate sampling rate determination circuitry 204 may select the output sampling rate as the second intermediate sampling rate 256 if the output sampling rate is less than the product.

For simplicity of description, the second intermediate sampling rate 256 is 32 kHz (e.g., the Nyquist sampling rate for a Super-Wideband frame having a 16 kHz bandwidth). However, it should be understood that 32 kHz is merely an illustrative example and should not be construed as limiting. In other implementations, the second intermediate sampling rate 256 may vary. The second intermediate sampling rate 256 may be provided to the low-band decoder 206 and to the high-band decoder 208.

Figure 5:
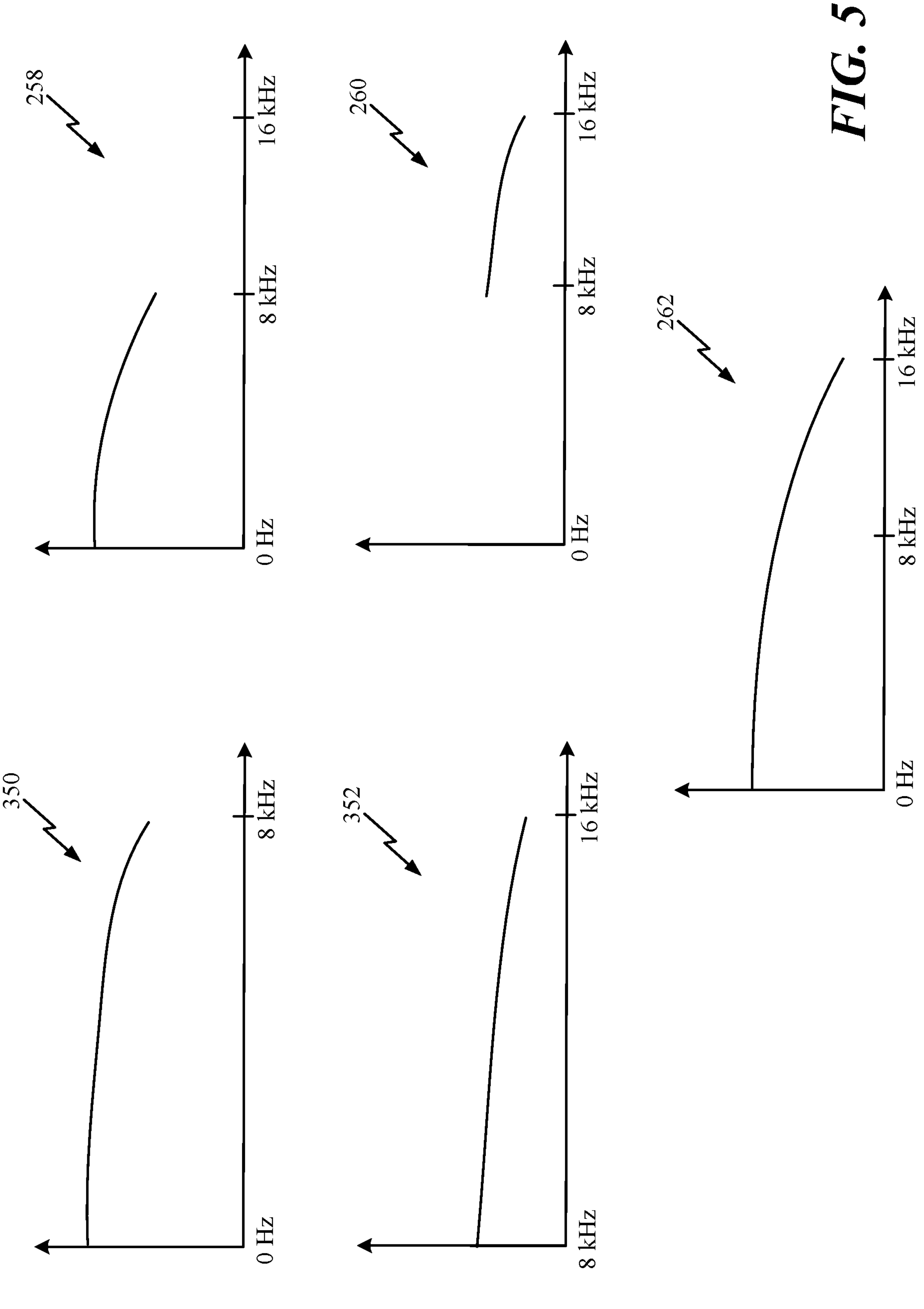
FIG. 5 illustrates additional signals associated with audio frames that are decoded using intermediate sampling rates.

The low-band decoder 206 may be configured to decode the second low-band signal 252 to generate a second decoded low-band signal 258 having the second intermediate sampling rate 256, and the high-band decoder 208 may be configured to decode the second high-band signal 254 to generate a second decoded high-band signal 260 having the second intermediate sampling rate 256. Referring to FIG. 3, the second low-band signal 252 may be provided to the low-band signal decoder 302. The low-band signal decoder 302 may decode the second low-band signal 252 to generate a decoded low-band signal 350. An illustration of the decoded low-band signal 350 is shown in FIG. 5. The decoded low-band signal 350 includes content spanning from approximately 0 Hz to 8 kHz (e.g., a low-band portion of a Super-Wideband signal). The decoded low-band signal 350 and the second intermediate sampling rate 256 may be provided to the low-band signal intermediate sample rate converter 304. The low-band signal intermediate sample rate converter 304 may be configured to sample the decoded low-band signal 350 at the second intermediate sampling rate 256 (e.g., 32 kHz) to generate the second decoded low-band signal 258 having the second intermediate sampling rate 256. An illustration of the second decoded low-band signal 258 is shown in FIG. 5. The second decoded low-band signal 258 includes content spanning from approximately 0 Hz to 8 kHz and has the 32 kHz intermediate sampling rate (e.g., the Nyquist sampling rate for a 16 kHz bandwidth signal).

The second high-band signal 254 may be provided to the high-band signal decoder 306. The high-band signal decoder 306 may decode the second high-band signal 254 to generate a decoded high-band signal 352. An illustration of the decoded high-band signal 352 is shown in FIG. 5. The decoded high-band signal 352 includes content spanning from approximately 8 kHz to 16 kHz (e.g., a high-band portion of a Super-Wideband signal). The decoded high-band signal 352 and the second intermediate sampling rate 256 may be provided to the high-band signal intermediate sample rate converter 308. The high-band signal intermediate sample rate converter 308 may be configured to sample the decoded high-band signal 352 at the second intermediate sampling rate 256 (e.g., 32 kHz) to generate the second decoded high-band signal 260 having the second intermediate sampling rate 256. An illustration of the second decoded high-band signal 260 is shown in FIG. 5. The second decoded high-band signal 260 includes content spanning from approximately 8 kHz to 16 kHz and has the 32 kHz intermediate sampling rate (e.g., the Nyquist sampling rate for a 16 kHz bandwidth signal).

Referring back to FIG. 1, the low-band decoder 206 may provide the second decoded low-band signal 258 to the adder 210, and the high-band decoder 208 may provide the second decoded high-band signal 260 to the adder 210. The adder 210 may be configured to combine the second decoded low-band signal 258 and the second decoded high-band signal 260 to generate a second combined signal 262 having the second intermediate sampling rate 256. An illustration of the second combined signal 262 is shown in FIG. 5. The second combined signal 262 includes content spanning from approximately 0 Hz to 16 kHz (e.g., the second combined signal 262 is a Super-Wideband signal), and the second combined signal 262 has the 32 kHz intermediate sampling rate (e.g., the Nyquist sampling rate). The second combined signal 262 may be provided to the post-processing circuitry 212.

The post-processing circuitry 212 may be configured to perform one or more processing operations on the second combined signal 262 to generate a second decoded output signal 264 having the second intermediate sampling rate 256. The second decoded output signal 264 may be provided to the sampler 214. The sampler 214 may be configured to generate a second resampled signal 266 having the output sampling rate (e.g., 48 kHz) based on the second decoded output signal 264. For example, the sampler 214 may be configured to sample the second decoded output signal 264 at the output sampling rate to generate the second resampled signal 266. Thus, the system 200 may process the second frame 224 at the second intermediate sampling rate 256 (e.g., the sampling rate at which the encoder encodes the second frame 224) and perform a single resampling operation at the output sampling rate (using the sampler 214) after the second frame 224 has been processed.

As described above, the intermediate sampling rate determination circuitry 204 may determine that the first frame 222 has the first intermediate sampling rate 236 and the second frame 224 has the second intermediate sampling rate 256. Thus, the intermediate sampling rate may switch from frame to frame. When the intermediate sampling rate switches, memories (e.g., an overlap-add (OLA) memory of Discrete Fourier Transform (DFT) synthesis operations) may be adjusted (e.g., calculated, re-calculated, resampled, approximated, etc.) to provide smooth continuous transitions from frame to frame.

One technique for adjusting the OLA memory may be to interpolate (or decimate) the OLA memory to the current frame's intermediate sampling rate. The interpolation/decimation of the OLA memory may be performed for frames corresponding to (e.g., preceding or following) changes in the intermediate sampling rate or may be performed in each frame for all valid intermediate sampling rates (and the result may be stored for the next frame). The stored interpolated memories of the current frame corresponding to the next frame's intermediate sampling rate may be used.

Another technique for adjusting the OLA may be to perform DFT synthesis at multiple intermediate sampling rates. The DFT synthesis may be performed in a current frame prior to a switch in intermediate sampling rate in anticipation of the switch in a subsequent frame. The OLA memory may be "backed up" at multiple sampling rates for use in the subsequent frame in the event of a switch of intermediate sampling rates. Alternatively, the DFT synthesis may be performed to the subsequent frame (e.g., the "switching frame"). The DFT bin information may be prior to DFT synthesis. If a switch occurs, an additional DFT synthesis may be performed at the intermediate sampling rate.

Another alternative technique for managing the switching of intermediate sampling rates across frames include resampling the outputs of the windowed inverse transformed signals to the output sample rate for each frame and performing the OLA after the resampling. In this implementation, the ICBWE branch of the decoder operation may not be operational.

The signal at the output of the sampler 214 may be adjusted to achieve continuity. For example, the configuration and the state of the sampler 214 may be adjusted when the intermediate sampling rate switches. Otherwise, there may be discontinuities seen at frame boundaries in the left and right resampled channels. To address the issues of this possible discontinuity, the sampler 214 may be run redundantly on a portion of left and right channels to resample the samples from the first frame's intermediate sampling rate to the output sampling rate and to resample the second frame's intermediate sampling rate to the output sampling rate. The portion of the left and right channels may include a part of the first frame, a part of the second frame, or both. The redundant portions of the signals, which are generated twice on the same portion of signal, may be windowed and overlap added to generate a smooth transition in the resampled channels in the vicinity of the frame boundary.

The techniques described with respect to FIGS. 2-5 may enable the system 200 to decode different frames at intermediate sampling rates that are based on sampling rates (or bandwidth) at which the frames are encoded (e.g., based on sampling rates associated with the coding modes of the frames). Decoding the frames at the intermediate sampling rates (as opposed to the output sampling rate of the decoder) may reduce the amount of sampling and resampling operations. This also reduces the complexity of operation of the post processing circuitry as well as the complexity of the low-band and high-band decoding steps which involve resampling the decoded signals to a desired sampling rate (in this case the intermediate sampling rate as opposed to the higher output sampling rate). For example, the low-band and the high-band may be processed and combined at the intermediate sampling rates. After the low-band and the high-band are combined, a single sampling operation may be performed to generate a signal at the output sampling rate. These techniques may reduce the number of sampling operations compared to conventional techniques in which the low-band is resampled at the output sampling rate (e.g., a first sampling operation), the high-band is resampled at the output sampling rate (e.g., a second sampling operation), and the resampled signals are combined. Reducing the number of resampling operations may reduce cost and computation complexity.

Figure 6:
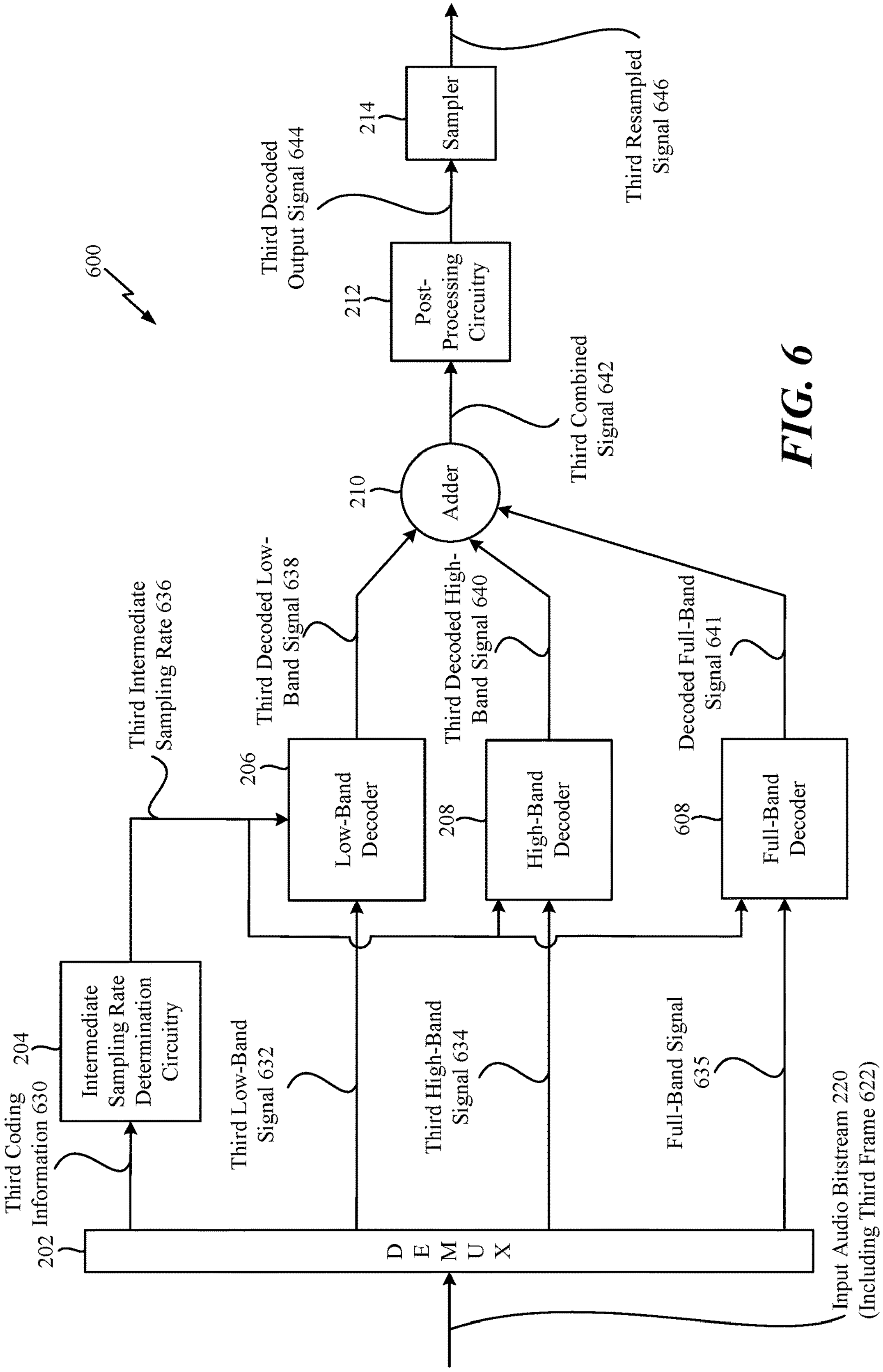
FIG. 6 depicts another decoding system operable to decode an audio frame using an intermediate sampling rate associated with a coding mode of the audio frame.

Referring to FIG. 6, a system 600 for processing an audio signal is shown. The system 600 may be a decoding system (e.g., an audio decoder). For example, the system 600 may correspond to the decoder 118 of FIG. 1. The system 600 includes the demultiplexer 202, the intermediate sampling rate determination circuitry 204, the low-band decoder 206, the high-band decoder 208, a full-band decoder 608, the adder 210, the post-processing circuitry 212, and the sampler 214.

The demultiplexer 202 may be configured to receive the input audio bitstream 220. The input audio bitstream 220 may include third frame 622 that is received after the second frame 224 of FIG. 2. According to FIG. 6, the third frame 622 may be encoded according to the Full-band coding mode. For example, the third frame 622 may include content from approximately 0 Hz to 20 kHz. The system 600 may be operable to decode the third frame 622 using an intermediate sampling rate.

To decode the third frame 622, the demultiplexer 202 may be configured to generate third coding information 630 associated with the third frame 622, a third low-band signal 632, a third high-band signal 634, and a full-band signal 635. The third coding information 630 may be provided to the intermediate sampling rate determination circuitry 204, the third low-band signal 632 may be provided to the low-band decoder 206, the third high-band signal 634 may be provided to the high-band decoder 208, and the full-band signal 635 may be provided to the full-band decoder 608.

The intermediate sampling rate determination circuitry 204 may be configured to determine a third intermediate sampling rate 636 of the third frame 622 based on the third coding information 630. For example, the intermediate sampling rate determination circuitry 204 may determine a third bitrate of the third frame 622 based on the third coding information 630. The third bitrate may be based on a third bandwidth of the third frame 622. Thus, if the third frame 622 is a Full-band frame having a third bandwidth between of approximately 20 kHz (e.g., having content within a frequency range spanning from 0 Hz to 20 kHz), the third bitrate of the third frame 622 may be associated with a maximum sample rate of 40 kHz (e.g., the Nyquist sampling rate of a signal having a 20 kHz bandwidth). In some alternative implementation, the third sampling rate may be chosen as 48 kHz itself if the implementation does not support operation at 40 kHz sampling rate. The intermediate sampling rate determination circuitry 204 may compare the third bitrate (e.g., a bitrate associated with a maximum sample rate of 40 kHz) to the output sampling rate (e.g., 48 kHz). The third intermediate sampling rate 636 may be based on the third bandwidth of the third frame 622 if the third bitrate is less than the output sampling rate.

For simplicity of description, the third intermediate sampling rate 636 is 40 kHz (e.g., the Nyquist sampling rate for a Full-band frame having a 20 kHz bandwidth). However, it should be understood that 40 kHz is merely an illustrative example and should not be construed as limiting. In other implementations, the third intermediate sampling rate 636 may vary. The third intermediate sampling rate 636 may be provided to the low-band decoder 206, to the high-band decoder 208, and to the full-band decoder 608.

The low-band decoder 206 may be configured to decode the third low-band signal 632 to generate a third decoded low-band signal 638 having the third intermediate sampling rate 636, and the high-band decoder 208 may be configured to decode the third high-band signal 634 to generate a third decoded high-band signal 640 having the third intermediate sampling rate 636. The low-band decoder 206 and the high-band decoder 208 may operate in a substantially similar manner as described with respect to FIGS. 2 and 3; however, the decoded signals 638, 640 may have a bandwidth of 20 kHz (as opposed to 16 kHz) based on the third intermediate sampling rate 636.

The full-band decoder 608 may be configured to decode the full-band signal 635 to generate a decoded full-band signal 641 having content between approximately 16 kHz and 20 kHz. For example, referring to FIG. 7, a diagram of a particular implementation of the full-band decoder 608 is shown. The full-band decoder 608 includes a full-band signal decoder 702 and a full-band signal intermediate sample rate converter 704.

Figure 7:
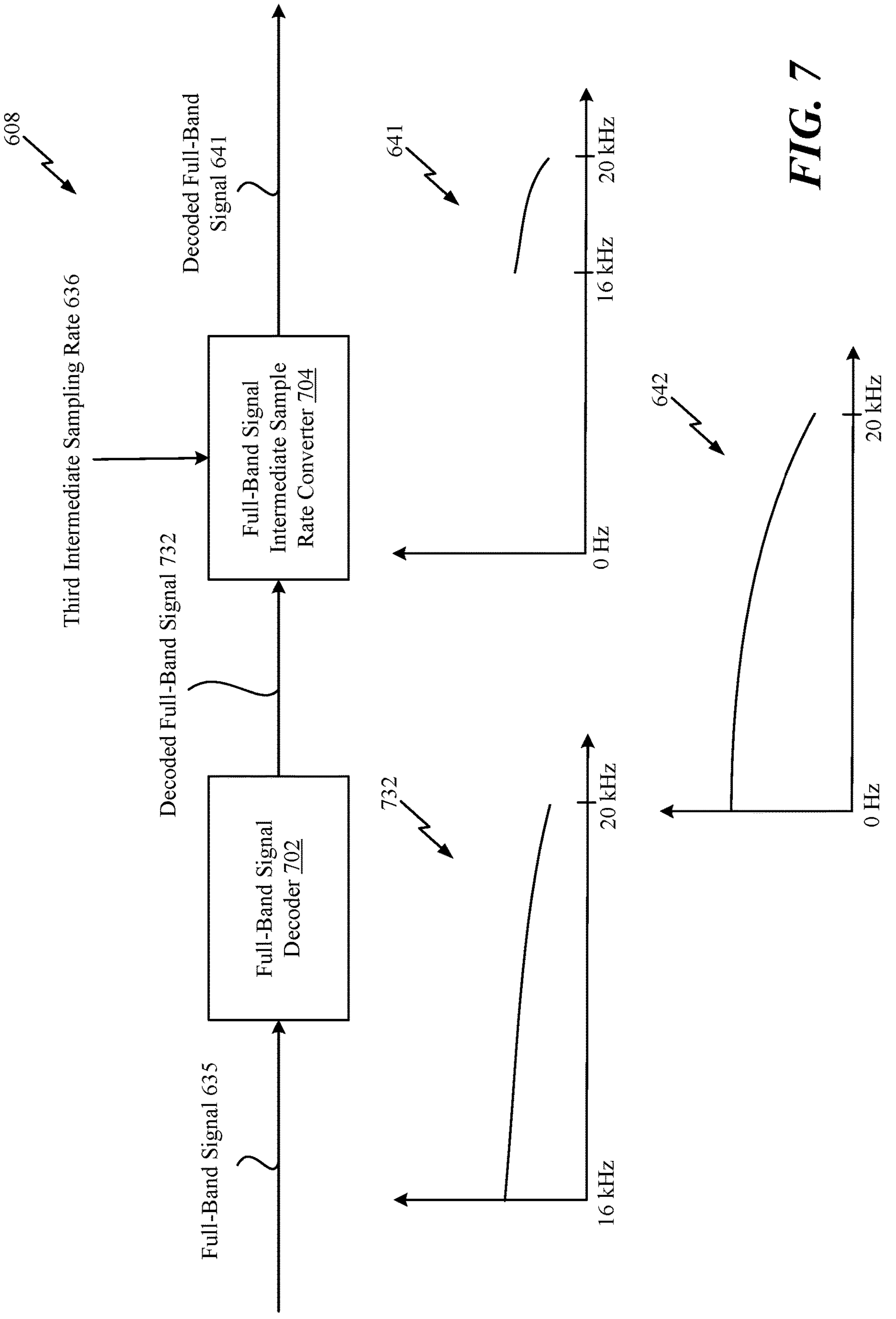
FIG. 7 depicts a full-band decoder operable to decode a full-band portion of an audio frame using an intermediate sampling rate associated with a coding mode of the audio frame.

The full-band signal 635 may be provided to the full-band signal decoder 702. The full-band signal decoder 702 may decode the full-band signal 635 to generate a decoded full-band signal 732. An illustration of the decoded full-band signal 732 is shown in FIG. 7. The decoded full-band signal 732 includes content spanning from approximately 16 kHz to 20 kHz (e.g., a full-band portion of a Full-band signal). The decoded full-band signal 732 and the third intermediate sampling rate 636 may be provided to the full-band signal intermediate sample rate converter 704. The full-band signal intermediate sample rate converter 704 may be configured to sample the decoded full-band signal 730 at the third intermediate sampling rate 636 (e.g., 40 kHz) to generate the decoded full-band signal 641 having the third intermediate sampling rate 636. An illustration of the decoded full-band signal 641 is shown in FIG. 7. The decoded full-band signal 641 includes content spanning from approximately 16 kHz to 20 kHz and has the 40 kHz intermediate sampling rate (e.g., the Nyquist sampling rate for a 20 kHz bandwidth signal). In a particular implementation, the decoded full-band signal 732 includes time-domain full-band signals.

Referring back to FIG. 6, the low-band decoder 206 may provide the third decoded low-band signal 638 to the adder 210, the high-band decoder 208 may provide the third decoded high-band signal 640 to the adder 210, and the full-band decoder 608 may provide the decoded full-band signal 641 to the adder 210. The adder 210 may be configured to combine the third decoded low-band signal 638, the third decoded high-band signal 640, and the decoded full-band signal 641 to generate a third combined signal 642 having the third intermediate sampling rate 636. An illustration of the third combined signal 642 is shown in FIG. 7. Combination of the third decoded low-band signal 638, the third decoded high-band signal 640, and the decoded full-band signal 641 may be performed in different order. As a non-limiting example, the third decoded low-band signal 638 may be combined with the third decoded high-band signal 640, and the resulting signal may be combined with the decoded full-band signal 641. As another non-limiting example, the third decoded high-band signal 640 may be combined with the decoded full-band signal 641, and the resulting signal may be combined with the third decoded low-band signal 638. The third combined signal 642 includes content spanning from approximately 0 Hz to 20 kHz (e.g., the third combined signal 242 is a Full-band signal), and the third combined signal 642 has the 40 kHz intermediate sampling rate (e.g., the Nyquist sampling rate). The third combined signal 642 may be provided to the post-processing circuitry 212.

The post-processing circuitry 212 may be configured to perform one or more processing operations on the third combined signal 642 to generate a third decoded output signal 644 having the third intermediate sampling rate 636. The third decoded output signal 644 may be provided to the sampler 214. The sampler 214 may be configured to generate a third resampled signal 646 having the output sampling rate (e.g., 48 kHz) based on the third decoded output signal 644. For example, the sampler 614 may be configured to sample the third decoded output signal 644 at the output sampling rate to generate the third resampled signal 246.

Thus, the system 600 may process the third frame 622 at the third intermediate sampling rate 636 (e.g., the sampling rate at which the encoder encodes the third frame 622) and perform a single resampling operation at the output sampling rate (using the sampler 214) after the third frame 622 has been processed.

Figure 8A:
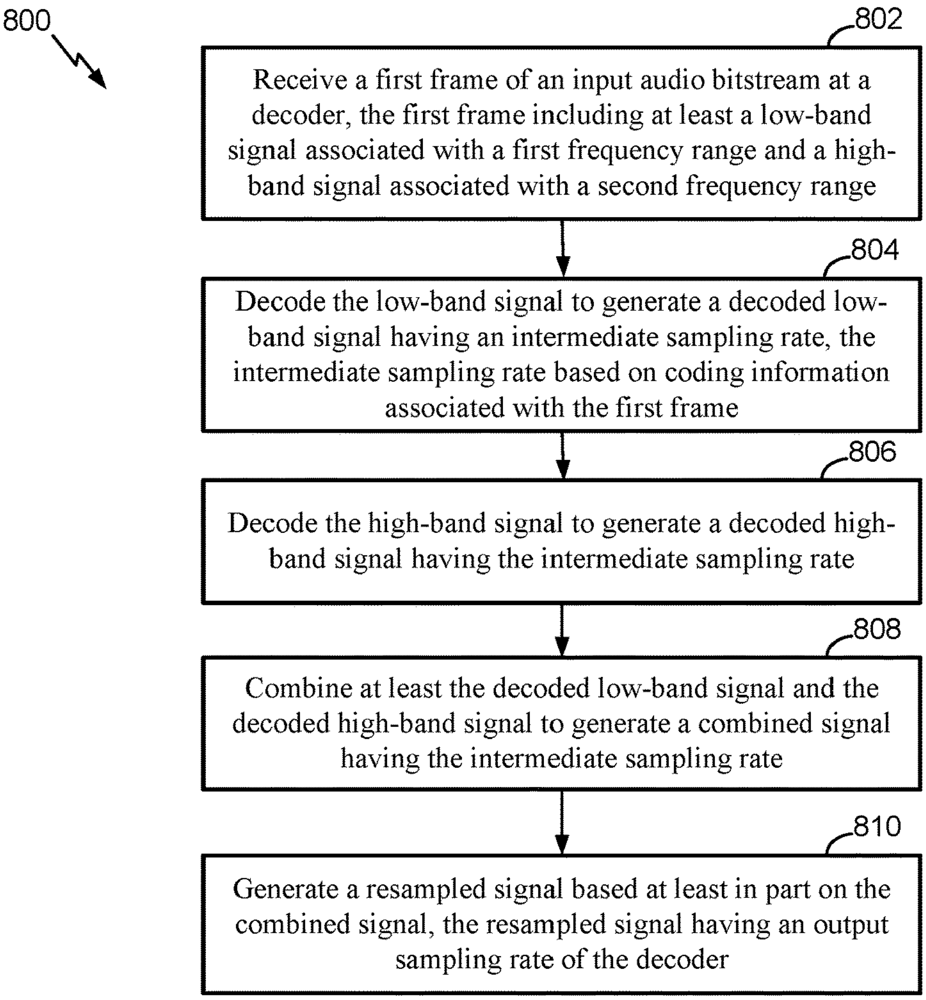
FIG. 8A depicts a method for decoding a frame using an intermediate sampling rate associated with a coding mode of the frame.

Referring to FIG. 8A, a method 800 for processing a signal is shown. The method 800 may be performed by the decoder 118 of FIG. 1, the system 200 of FIG. 2, the low-band decoder 206 of FIG. 3, the high-band decoder 208 of FIG. 3, the system 600 of FIG. 6, the full-band decoder 608 of FIG. 7, or a combination thereof.

The method 800 includes receiving a first frame of an input audio bitstream at a decoder, at 802. The first frame includes at least a low-band signal associated with a first frequency range and a high-band signal associated with a second frequency range. For example, referring to FIG. 2, the demultiplexer 202 may receive the first frame 222 of the input audio bitstream 220 transmitted from an encoder. The first frame 222 includes the first low-band signal 232 associated with a first frequency range (e.g., 0 Hz to 4 kHz) and the first high-band signal 234 associated with a second frequency range (e.g., 4 kHz to 8 kHz).

The method 800 also includes decoding the low-band signal to generate a decoded low-band signal having an intermediate sampling rate, at 804. The intermediate sampling rate may be based on coding information associated with the first frame. For example, referring to FIG. 2, the low-band decoder 206 may decode the first low-band signal 232 to generate the first decoded low-band signal 238 having the first intermediate sampling rate 236 (e.g., 16 kHz).

The method 800 further includes decoding the high-band signal to generate a decoded high-band signal having the intermediate sampling rate, at 806. For example, referring to FIG. 2, the high-band decoder 208 may decode the first high-band signal 234 to generate the first decoded high-band signal 240 having the first intermediate sampling rate 236.

The method 800 also includes combining at least the decoded low-band signal and the decoded high-band signal to generate a combined signal having the intermediate sampling rate, at 808. For example, referring to FIG. 2, the adder 210 may combine the first decoded low-band signal 238 and the first decoded high-band signal 240 to generate the first combined signal 242 having the first intermediate sampling rate 236.

The method 800 further includes generating a resampled signal based at least in part on the combined signal, at 810. The resampled signal may have an output sampling rate of the decoder. For example, referring to FIG. 2, the post-processing circuitry 212 may perform one or more processing operations on the first combined signal 242 to generate the first decoded output signal 244 having the first intermediate sampling rate 236, and the sampler 214 may generate the first resampled signal 246 having the output sampling rate (e.g., 48 kHz) based on the first decoded output signal 244. For example, the sampler 214 may be configured to sample the first decoded output signal 244 at the output sampling rate to generate the first resampled signal 246.

According to one implementation of the method 800, the first frame may also include a full-band signal associated with a third frequency range (e.g., 16 kHz to 20 kHz). The method 800 may also include decoding the full-band signal to generate a decoded full-band signal having the intermediate sampling rate. The decoded full-band signal may be combined with the decoded low-band signal and the decoded high-band signal to generate the combined signal.

According to one implementation, the method 800 may also include receiving a second frame of the input audio bitstream at the decoder. The second frame may include at least a second low-band signal associated with a third frequency range and a second high-band signal associated with a fourth frequency range. For example, referring to FIG. 2, the demultiplexer 202 may receive the second frame 224 of the input audio bitstream 220. The second frame 224 may include the second low-band signal 252 associated with a third frequency range (e.g., 0 Hz to 8 kHz) and the second high-band signal 254 associated with a fourth frequency range (e.g., 8 kHz to 16 kHz).

The method 800 may also include decoding the second low-band signal to generate a second decoded low-band signal having a second intermediate sampling rate. The second intermediate sampling rate may be based on coding information associated with the second frame, and the second intermediate sampling rate may be different than the intermediate sampling rate. For example, referring to FIG. 2, the low-band decoder 206 may decode the second low-band signal 252 to generate the second decoded low-band signal 258 having the second intermediate sampling rate 256 (e.g., 32 kHz).

The method 800 may also include decoding the second high-band signal to generate a second decoded high-band signal having the second intermediate sampling rate. For example, referring to FIG. 2, the high-band decoder 208 may decode the second high-band signal 254 to generate the second decoded high-band signal 260 having the second intermediate sampling rate 256.

The method 800 may also include combining at least the second decoded low-band signal and the second decoded high-band signal to generate a combined signal having the second intermediate sampling rate. For example, referring to FIG. 2, the adder 210 may combine the second decoded low-band signal 258 and the second decoded high-band signal 260 to generate the second combined signal 262 having the second intermediate sampling rate 256.

The method 800 may further include generating a second resampled signal based at least in part on the second combined signal. The second resampled signal may have the output sampling rate of the decoder. For example, referring to FIG. 2, the post-processing circuitry 212 perform one or more processing operations on the second combined signal 262 to generate the second decoded output signal 264 having the second intermediate sampling rate 256, and the sampler 214 may generate the second resampled signal 266 having the output sampling rate (e.g., 48 kHz) based on the second decoded output signal 264. For example, the sampler 214 may sample the second decoded output signal 264 at the output sampling rate to generate the second resampled signal 266.

Figure 8B:
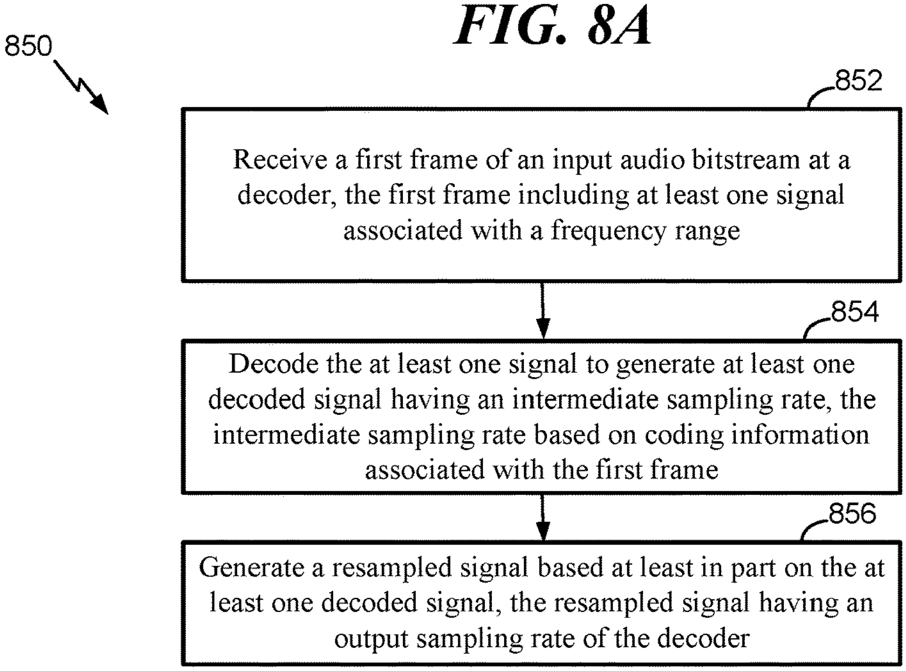
FIG. 8B depicts another method for decoding a frame using an intermediate sampling rate associated with a coding mode of the frame.

Referring to FIG. 8B, another method 850 for processing a signal is shown. The method 850 may be performed by the decoder 118 of FIG. 1, the system 200 of FIG. 2, the low-band decoder 206 of FIG. 3, the high-band decoder 208 of FIG. 3, the system 600 of FIG. 6, the full-band decoder 608 of FIG. 7, or a combination thereof.

The method 850 includes receiving a first frame of an input audio bitstream at a decoder, at 852. The first frame may include at least one signal associated with a frequency range. The method 850 also includes decoding the at least one signal to generate at least one decoded signal having an intermediate sampling rate, at 854. The intermediate sampling rate may be based on coding information associated with the first frame. The method 850 also includes generating a resampled signal based at least in part on the at least one decoded signal. The resampled signal may have an output sampling rate of the decoder.

The methods 800, 850 of FIGS. 8A-8B may enable different frames to be decoded at intermediate sampling rates that are based on sampling rates at which the frames are encoded (e.g., based on sampling rates associated with the coding modes of the frames). Decoding the frames at the intermediate sampling rates (as opposed to the output sampling rate of the decoder) may reduce the amount of sampling and resampling operations. For example, the low-band and the high-band may be processed and combined at the intermediate sampling rates. After the low-band and the high-band are combined, a single sampling operation may be performed to generate a signal at the output sampling rate. These techniques may reduce the number of sampling operations compared to conventional techniques in which the low-band is resampled at the output sampling rate (e.g., a first sampling operation), the high-band is resampled at the output sampling rate (e.g., a second sampling operation), and the resampled signals are combined. Reducing the number of resampling operations may reduce cost and computation complexity.

An example implementation describing the full system is presented. A decoder designed to decode the encoded information about a frame of speech may be received. The encoded information may include information about the encoded bandwidth on the encoder. This information could be either conveyed as a part of the bitstream or could be indirectly derived from the coding mode, a bitrate, etc. As an example, with knowledge of the CODEC's operation scheme, when the bitrate of a particular frame is a first value, there could be an associated maximum bandwidth of coding supported at the bitrate. This is an indication that the true encoded bandwidth is less than or equal to the maximum bandwidth supported at the bitrate of the particular frame. This bandwidth information (either directly or indirectly inferred) may be used to determine an intermediate sampling rate of operation which may be less than or equal to the desired output sampling rate of the decoder. The decoded speech's sampling rate from each band could be restricted to be lesser than or equal to this intermediate sampling rate.

For example, in FIG. 2, the intermediate sampling rate determination circuitry 204 may determine the intermediate sampling rate. In a particular implementation when the coder is operating in multiple bands (e.g., the low-band, high-band, etc.), the low-band decoder 206 may sample the decoded low-band signal at a sample rate lesser than or equal to the intermediate sampling rate (e.g., this could be the operating sampling rate of the low-band core—16 kHz or 12.8 kHz). Similarly, the high-band could provide the decoded high-band signal at a sampling rate lesser than or equal to the intermediate sampling rate (e.g., this could be the intermediate sampling rate itself). In an alternative implementation, the decoding process could be performed in a single band where the low-band decoder could encompass the entire bandwidth of the encoded signal and the high-band decoding is not present in this situation. In some implementations, the low-band and the high-band decoders may be followed by a DFT analysis module which can convert the time domain decoded low-band and high-band signals into a DFT domain. Since the decoded low-band and the decoded high-band signals are sampled at rates less than or equal to the intermediate sampling rate which is lesser than or equal to the output sampling rate, the DFT analysis processing may require lesser number of instructions thus saving on operation power and time of the decoding process.

It should be noted that the intermediate sample rate is determined at each frame based on the received encoded bitstream and is thus prone to variations from frame to frame. It should be noted that once the DFT analysis step is performed, the post-processing steps may include application of stereo cues and a further upmix to obtain multi-channel information in DFT analysis domain. The processing in the DFT analysis domain for the application of the stereo cues and the upmix may be optionally performed at either the intermediate sampling rate, or the output sampling rate. This stereo upmix step may be followed by a DFT synthesis step which may reside inside the post-processing module itself. In a particular implementation, the DFT synthesis may produce the decoded output signal sampled at the output sampling rate directly. In this implementation, the operations performed at the sampler 214 may be bypassed and the decoded output signal may directly be used as the resampled signal. In another alternative implementation, the DFT synthesis step may produce the decoded output at the intermediate sampling rate. In this particular implementation, the post-processing circuitry 212 may be followed by sampling operations (at the sampler 214) to resample the decoded output signal to the desired output sampling rate to produce the resampled signal. In this scenario, operations may be performed to handle the OLA memories of the DFT synthesis steps when intermediate sample rate is switching.

In one particular implementation, when the frame type switches from one mode in a first frame (e.g., TCX or ACELP coding mode) to another mode in a second frame (e.g., ACELP or TCX coding mode), due to different delays of the decoding steps of the coding modes both frames may redundantly estimate samples corresponding to a particular inter-frame overlapping region. To accommodate for this, a "fade-in fade-out" step is performed prior to the DFT analysis. Fade-in indicates the samples of the second frame are windowed with an increasing window at the overlap region and Fade-out indicates that the samples of the first frame are windowed with a decreasing complementary window in the overlap region. In the case when the coding mode switched as well as the intermediate sample rate is switching simultaneously in the same second frame following the first frame, the fade-out portion corresponding to the first frame was estimated at the first frame's intermediate sample rate and this needs to be resampled to the second frame's intermediate sample rate. In other alternative methods, a simultaneous change of the coding mode and the intermediate sample rate may be disallowed and the intermediate sample rate of the first frame may be maintained in the second frame if the coding mode of the second frame differs from the coding mode of the first frame.

In particular implementations, the methods 800, 850 of FIGS. 8A-8B may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the methods 800, 850 of FIGS. 8A-8B may be performed by a processor that executes instructions, as described with respect to FIG. 12.

Figure 9:
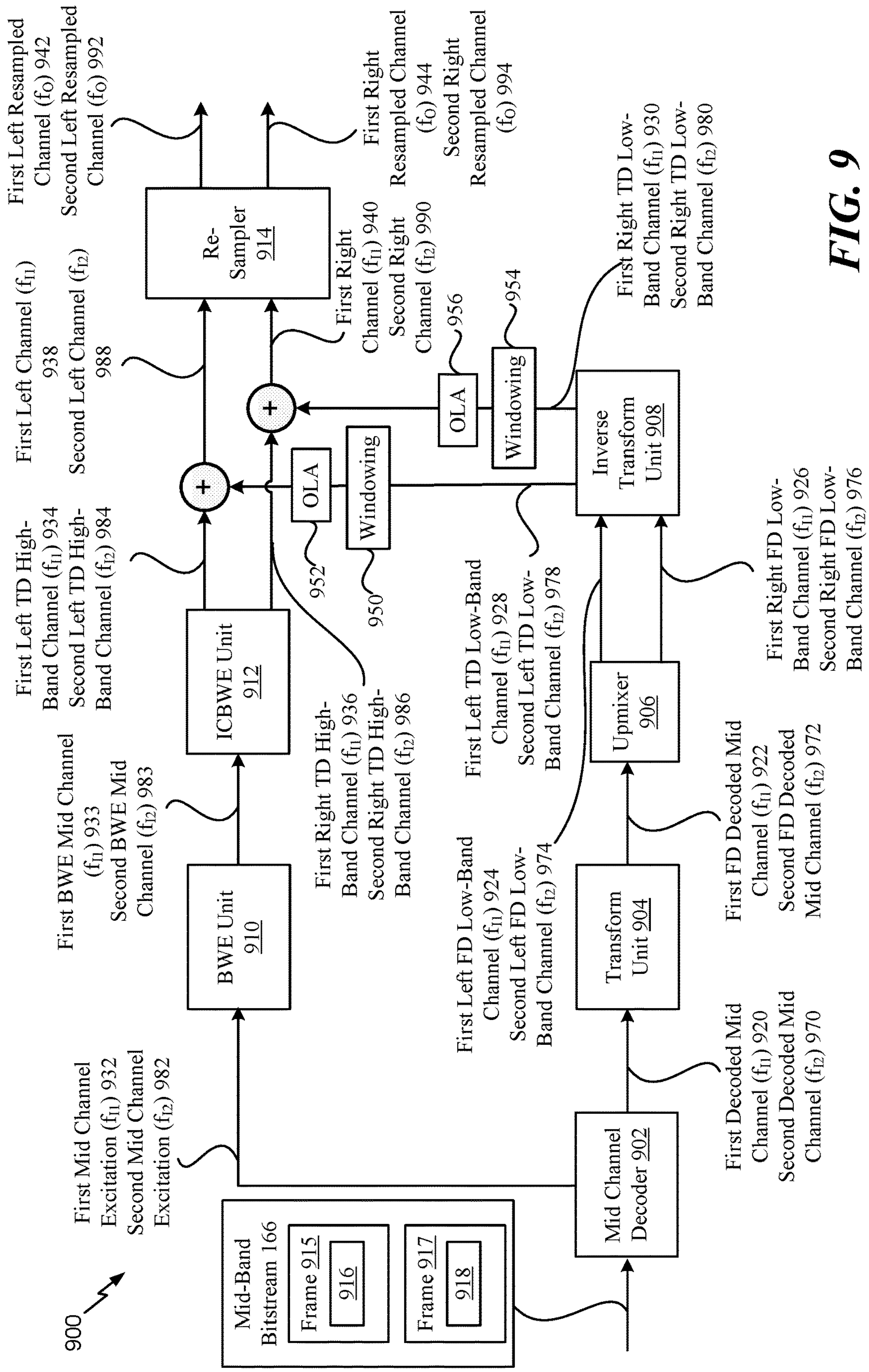
FIG. 9 depicts a system operable to decode an audio frame using an intermediated sampling rate associated with a coding mode of the audio frame.

Referring to FIG. 9, a particular implementation of a system 900 for decoding an audio signal is shown. According to one implementation, the system 900 may correspond to the decoder 118 of FIG. 1. The system 900 includes a mid channel decoder 902, a transform unit 904, an upmixer 906, an inverse transform unit 908, a bandwidth extension (BWE) unit 910, an inter-channel BWE (ICBWE) unit 912, and a re-sampler 914. In some implementations, one or more of the components in the system 900 may not be present or may be replaced by another component that serves a similar purpose. For example, in some implementations, the ICBWE path may not be present.

The mid-band bitstream 166 (e.g., a mid channel audio bitstream) may be provided to the mid channel decoder 902. The mid-band bitstream 166 may include a first frame 915 and a second frame 917. The first frame 915 may have a first bandwidth that is based on first coding information 916 associated with the first frame 915. The first coding information 916 may be a two-bit indicator indicating a first coding mode used by the encoder 114 to encode the first frame 915. The first coding mode may include a Wideband coding mode, a Super-Wideband coding mode, or a Full-band coding mode. For ease of illustration, as used herein, the first coding mode corresponds to a Wideband coding mode. However, in other implementations, the first coding mode may be a Super-Wideband coding mode or a Full-band coding mode. The first bandwidth may be based on the first coding mode.

The second frame 917 may have a second bandwidth that is based on second coding information 918 associated with the second frame 917. The second coding information 918 may be a two-bit indicator indicating a second coding mode used by the encoder 114 to encode the second frame 917. The second coding mode may include a Wideband coding mode, a Super-Wideband coding mode, or a Full-band coding mode. For ease of illustration, as used herein, the second coding mode corresponds to a Super-Wideband coding mode. However, in other implementations, the second coding mode may be a Wideband coding mode or a Full-band coding mode. Thus, the system 900 may decode multiple frames where the coding mode changes from frame to frame. The second bandwidth may be based on the second coding mode.

To decode the first frame 915, the first bandwidth of the first frame 915 may be determined. For example, the intermediate sampling rate determination circuitry 172 of FIG. 1 may determine that the first bandwidth is 8 kHz because the first frame 915 is Wideband frame. The intermediate sampling rate determination circuitry 172 may determine a first intermediate sampling rate (flu) based on a Nyquist sampling rate of the first bandwidth. For example, because the first bandwidth is 8 kHz, the first intermediate sampling rate may be equal to 16 kHz.

The mid channel decoder 902 may be configured to decode a first encoded mid channel of the first frame 915 to generate a first decoded mid channel 920 having the first intermediate sampling rate. The first decoded mid channel 920 may be provided to the transform unit 904. The transform unit 904 may be configured to perform a time-to-frequency domain conversion operation on the first decoded mid channel 920 to generate a first frequency-domain decoded mid channel 922 having the first intermediate sampling rate. For example, the time-to-frequency domain conversion operation may include a Discrete Fourier Transform (DFT) conversion operation. The first frequency-domain decoded mid channel 922 may be provided to the upmixer 906.

Although a frequency domain transform is specified, the frequency domain transformation may also correspond to other transformations, such as sub-band transformations, wavelet transformation, or any other quasi frequency-domain or sub-band domain transformation.

The upmixer 906 may be configured to perform a frequency-domain upmix operation on the first frequency-domain decoded mid channel 922 to generate a first left frequency-domain low-band channel 924 having the first intermediate sampling rate and a first right frequency-domain low-band channel 926 having the first intermediate sampling rate. For example, the upmixer 906 may use one or more of the stereo cues 162 to perform the frequency-domain upmix operation on the first frequency-domain decoded mid channel 922. The first left frequency-domain low-band channel 924 may be provided to the inverse transform unit 908, and the first right frequency-domain low-band channel 926 may be provided to the inverse transform unit 908.

The inverse transform unit 908 may be configured to perform a frequency-to-time domain conversion operation on the first left frequency-domain low-band channel 924 to generate a first left time-domain low-band channel 928 having the first intermediate sampling rate. The first left time-domain low-band channel 928 may undergo a windowing operation 950 and an overlap-add (OLA) operation 952. According to one implementation, the frequency-to-time domain conversion operation may include an inverse DFT (IDFT) operation. The inverse transform unit 908 may also be configured to perform a frequency-to-time domain conversion operation on the first right frequency-domain low-band channel 926 to generate a first right time-domain low-band channel 930 having the first intermediate sampling rate. The first right time-domain low-band channel 930 may undergo a windowing operation 954 and an OLA operation 956.

The mid channel decoder 902 may also be configured to generate a first mid channel excitation 932 having the first intermediate sampling rate based on the first encoded mid channel of the first frame 915. The first mid channel excitation 932 may be provided to the BWE unit 910. The BWE unit 910 may be configured to perform a bandwidth extension operation on the first mid channel excitation 932 to generate a first BWE mid channel 933 having the first intermediate sampling rate. The first BWE mid channel 933 may be provided to the ICBWE unit 912.

The ICBWE unit 912 may be configured to generate a first left time-domain high-band channel 934 having the first intermediate sampling rate based on the first BWE mid channel 933. For example, the ICBWE unit 912 may use the stereo cues 162 (e.g., an ICBWE gain stereo cue) to generate the first left time-domain high-band channel 934. The ICBWE unit 912 may also be configured to generate a first right time-domain high-band channel 936 having the first intermediate sampling rate based on the first BWE mid channel 933.

The first left time-domain low-band channel 928 may be combined with the first left time-domain high-band channel 934 to generate a first left channel 938 having the first intermediate sampling rate. For example, one or more adders may be configured to combine the first left time-domain low-band channel 928 with the first left time-domain high-band channel 934. The first left channel 938 may be provided to the re-sampler 914. The first right time-domain low-band channel 930 may be combined with the first right time-domain high-band channel 936 to generate a first right channel 940 having the first intermediate sampling rate. For example, the one or more adders may be configured to combine the first right time-domain low-band channel 930 with the first right time-domain high-band channel 936. The first right channel 940 may be provided to the re-sampler 914.

In a particular implementation, the one or more adders may include or correspond to the adder 210 of FIG. 6. To illustrate, a full-band decoder, such as the full-band decoder 608 of FIG. 6, may perform decode operations on an encoded mid channel (e.g., the first frame 915) to generate a left time-domain full-band channel (e.g., a left time-domain full-band signal) and a right time-domain full-band channel (e.g., a right time-domain full-band signal). The one or more adders may be configured to combine the first left time-domain low-band channel 928, the first left time-domain high-band channel 934, and the left time-domain full-band channel to generate the first left channel 938, and the one or more adders may be configured to combine the first right time-domain low-band channel 930, the first right time-domain high-band channel 936, and the right time-domain full-band channel to generate the first right channel 940.

The re-sampler 914 may be configured to generate a first left resampled channel 942 having an output sampling rate ($f_O$) of the decoder 118. For example, the re-sampler 914 may resample the first left channel 938 to the output sampling rate to generate the first left resampled channel 942. Additionally, the re-sampler 914 may be configured to generate a first right resampled channel 944 having the output sampling rate by resampling the first right channel 940 to the output sampling rate.

To decode the second frame 917, the second bandwidth of the second frame 917 may be determined. For example, the intermediate sampling rate determination circuitry 172 of FIG. 1 may determine that the second bandwidth is 16 kHz because the second frame 917 is a Super-Wideband frame. The intermediate sampling rate determination circuitry 172 may determine a second intermediate sampling rate (f12) based on a Nyquist sampling rate of the second bandwidth. For example, because the second bandwidth is 16 kHz, the second intermediate sampling rate may be equal to 32 kHz.

The mid channel decoder 902 may be configured to decode a second encoded mid channel of the second frame 917 to generate a second decoded mid channel 970 having the second intermediate sampling rate. The second decoded mid channel 970 may be provided to the transform unit 904. The transform unit 904 may be configured to perform a time-to-frequency domain conversion operation on the second decoded mid channel 970 to generate a second frequency-domain decoded mid channel 972 having the second intermediate sampling rate. For example, the time-to-frequency domain conversion operation may include a DFT conversion operation. The second frequency-domain decoded mid channel 972 may be provided to the upmixer 906.

The upmixer 906 may be configured to perform a frequency-domain upmix operation on the second frequency-domain decoded mid channel 972 to generate a second left frequency-domain low-band channel 974 having the second intermediate sampling rate and a second right frequency-domain low-band channel 976 having the second intermediate sampling rate. For example, the upmixer 906 may use one or more of the stereo cues 162 to perform the frequency-domain upmix operation on the second frequency-domain decoded mid channel 972. The second left frequency-domain low-band channel 974 may be provided to the inverse transform unit 908, and the second right frequency-domain low-band channel 976 may be provided to the inverse transform unit 908.

The inverse transform unit 908 may be configured to perform a frequency-to-time domain conversion operation on the second left frequency-domain low-band channel 974 to generate a second left time-domain low-band channel 978 having the second intermediate sampling rate. The second left time-domain low-band channel 978 may undergo the windowing operation 950 and the OLA operation 952. According to one implementation, the frequency-to-time domain conversion operation may include an IDFT operation. The inverse transform unit 908 may also be configured to perform a frequency-to-time domain conversion operation on the second right frequency-domain low-band channel 976 to generate a second right time-domain low-band channel 980 having the second intermediate sampling rate. The second right time-domain low-band channel 980 may undergo the windowing operation 954 and the OLA operation 956.

The mid channel decoder 902 may also be configured to generate a second mid channel excitation 982 having the second intermediate sampling rate based on the second encoded mid channel of the second frame 917. The second mid channel excitation 982 may be provided to the BWE unit 910. The BWE unit 910 may be configured to perform a bandwidth extension operation on the second mid channel excitation 982 to generate a second BWE mid channel 983 having the second intermediate sampling rate. The second BWE mid channel 983 may be provided to the ICBWE unit 912.

The ICBWE unit 912 may be configured to generate a second left time-domain high-band channel 984 having the second intermediate sampling rate based on the second BWE mid channel 983. For example, the ICBWE unit 912 may use the stereo cues 162 (e.g., an ICBWE gain stereo cue) to generate the second left time-domain high-band channel 984. The ICBWE unit 912 may also be configured to generate a second right time-domain high-band channel 986 having the second intermediate sampling rate based on the second BWE mid channel 983.

The second left time-domain low-band channel 978 may be combined with the second left time-domain high-band channel 984 to generate a second left channel 988 having the second intermediate sampling rate. The second left channel 988 may be provided to the re-sampler 914. For example, the one or more adders may be configured to combine the second left time-domain low-band channel 978 with the second left time-domain high-band channel 984. The second right time-domain low-band channel 980 may be combined with the second right time-domain high-band channel 986 to generate a second right channel 990 having the second intermediate sampling rate. For example, the one or more adders may be configured to combine the second right time-domain low-band channel 980 with the second right time-domain high-band channel 986. The second right channel 990 is provided to the re-sampler 914.

In a particular implementation, the one or more adders may include or correspond to the adder 210 of FIG. 6. To illustrate, a full-band decoder, such as the full-band decoder 608 of FIG. 6, may perform decode operations on an encoded mid channel (e.g., the second frame 917) to generate a second left time-domain full-band channel and a second right time-domain full-band channel. The one or more adders may be configured to combine the second left time-domain low-band channel 978, the second left time-domain high-band channel 984, and the second left time-domain full-band channel to generate the second left channel 988, and the one or more adders may be configured to combine the second right time-domain low-band channel 980, the second right time-domain high-band channel 986, and the second right time-domain full-band channel to generate the second right channel 990.

The re-sampler 914 may be configured to generate a second left resampled channel 992 having the output sampling rate ($f_O$) of the decoder 118. For example, the re-sampler 914 may resample the second left channel 988 to the output sampling rate to generate the second left resampled channel 992. Additionally, the re-sampler 914 may be configured to generate a second right resampled channel 994 having the output sampling rate by resampling the second right channel 990 to the output sampling rate.

The signal at the output of the re-sampler 914 may be adjusted to achieve continuity. For example, the configuration and the state of the re-sampler 914 may be adjusted when the intermediate sampling rate switches. Otherwise, there may be discontinuities seen at frame boundaries in the left and right resampled channels. To address the issues of this possible discontinuity, the re-sampler 914 may be run redundantly on a portion of left and right channels to resample the samples from the first frame's (e.g., the frame 915) intermediate sampling rate to the output sampling rate and to resample the second frame's (e.g., the frame 917) intermediate sampling rate to the output sampling rate. The portion of the left and right channels may include a part of the frame 915, a part of the frame 917, or both.

The system 900 of FIG. 9 may enable different frames to be decoded at intermediate sampling rates that are based on sampling rates at which the frames are encoded (e.g., based on sampling rates associated with the coding modes of the frames). Decoding the frames at the intermediate sampling rates (as opposed to the output sampling rate of the decoder) may reduce the amount of sampling and resampling operations. For example, the low-band and the high-band may be processed and combined at the intermediate sampling rates. After the low-band and the high-band are combined, a single sampling operation may be performed to generate a signal at the output sampling rate. These techniques may reduce the number of sampling operations compared to conventional techniques in which the low-band is resampled at the output sampling rate (e.g., a first sampling operation), the high-band is resampled at the output sampling rate (e.g., a second sampling operation), and the resampled signals are combined. Reducing the number of resampling operations may reduce cost and computation complexity of the system 900.

Figure 10:
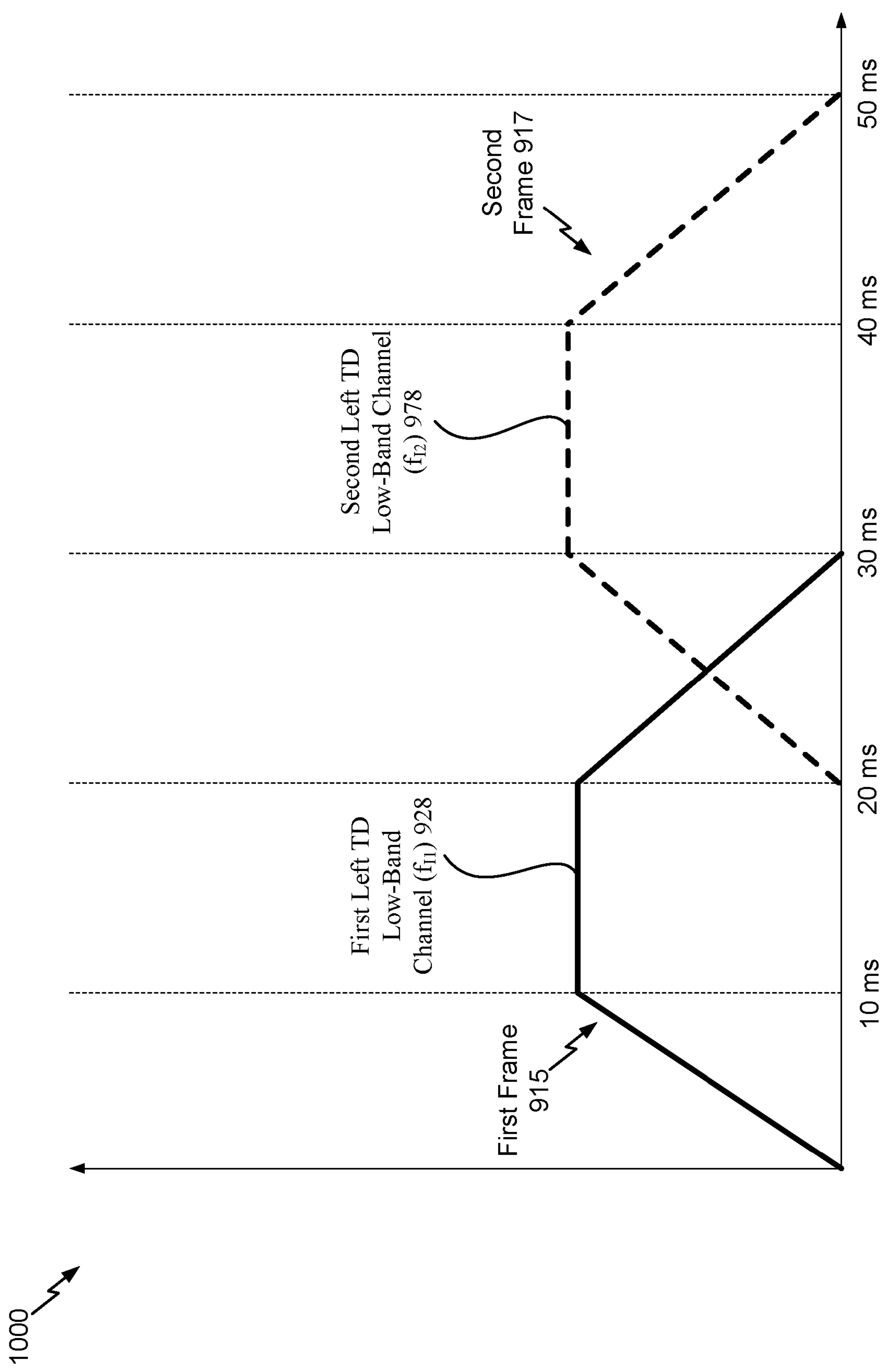
FIG. 10 depicts an overlap-add operation.

Referring to FIG. 10, a diagram 1000 illustrating an overlap-add operation is shown. According to the diagram, the first frame 915 is depicted using a solid line, and the second frame 917 is depicted using a dotted line. The diagram 1000 depicts the first left time-domain low-band channel 928 of the first frame 915 and the second left time-domain low-band channel 978 of the second frame 917. However, in other implementations, the techniques described with respect to FIG. 10 may be used in conjunction with other channels of the frames 915, 917. As a non-limiting example, the techniques described with respect to FIG. 10 may be used in conjunction with the first right time-domain low-band channel 930, the second right time-domain low-band channel 980, the first left time-domain high-band channel 934, the second left time-domain high-band channel 984, the first right time-domain high-band channel 936, the second right time-domain high-band channel 986, the first left channel 938, the second left channel 988, the first right channel 940, or the second right channel 990.

The first left time-domain low-band channel 928 may span from 0 ms to 30 ms, and the second left time-domain low-band channel 978 may span from 20 ms to 50 ms. A first portion of the first left time-domain low-band channel 928 may span from 0 ms to 20 ms, and a second portion of the first left time-domain low-band channel 928 may span from 20 ms to 30 ms. A first portion of the second left time-domain low-band channel 978 may span from 20 ms to 30 ms, and a second portion of the second left time-domain low-band channel 978 may span from 30 ms to 50 s. Thus, the second portion of the first left time-domain low-band channel 928 and the first portion of the second left time-domain low-band channel 978 may overlap.

The decoder 118 may resample the second portion of the first left time-domain low-band channel 928 based on the second intermediate sampling rate (e.g., the sampling rate of the second frame 917) to generate a resampled second portion of the left time-domain low-band channel 928 having the second sampling rate. The decoder 118 may also perform an overlap-add operation on the resampled second portion of the left time-domain low-band channel 928 and the first portion of the second left time-domain low-band channel 978 so that the overlapping portions of the frames 915, 917 have the same sampling rate (e.g., the second intermediate sampling rate). As a result, artifacts may be reduced when the overlapping portions of the frames 915, 917 are played (e.g., output by one or more speakers).

In a particular implementation, resampling a portion of a channel (or other signal) may include upsampling. For example, if the first left time-domain low-band channel 928 is associated with a first intermediate sampling rate and the second left time-domain low-band channel 978 is associated with a second intermediate sampling rate that is higher than the first intermediate sampling rate, one or more interpolation operations (or other upsampling operations) may be performed on the second portion of the first left time-domain low-band channel 928 to generate the resampled second portion of the left time-domain low-band channel 928 having the second intermediate sampling rate (e.g., the resampled second portion of the left time-domain low-band channel 928 includes a greater number of samples than the second portion of the left time-domain low-band channel 928).

As another example, if the first left time-domain low-band channel 928 is associated with a first intermediate sampling rate and the second left time-domain low-band channel 978 is associated with a second intermediate sampling rate that is lower than the first intermediate sampling rate, one or more downsampling and filtering operations may be performed on the second portion of the first left time-domain low-band channel 928 to generate the resampled second portion of the left time-domain low-band channel 928 having the second intermediate sampling rate (e.g., the resampled second portion of the left time-domain low-band channel 928 includes a smaller number of samples than the second portion of the left time-domain low-band channel 928). After being generating, the resampled second portion of the left time-domain low-band channel 928 and the first portion of the second left time-domain low-band channel 978 have the same intermediate rate (e.g., the second intermediate sampling rate) and may be combined by the overlap-add operation. Although resampling of the second portion of the first left time-domain low-band channel 928 (e.g., a first input) has been described, in other implementations, the decoder 118 may perform a resampling operation on the first portion of the second left time-domain low-band channel 978 (e.g., a second input) to generate a resampled first portion of the second left time-domain low-band channel 978 to be combined with the second portion of the first left time-domain low-band channel 928 using an overlap-add operation.

Figure 11A:
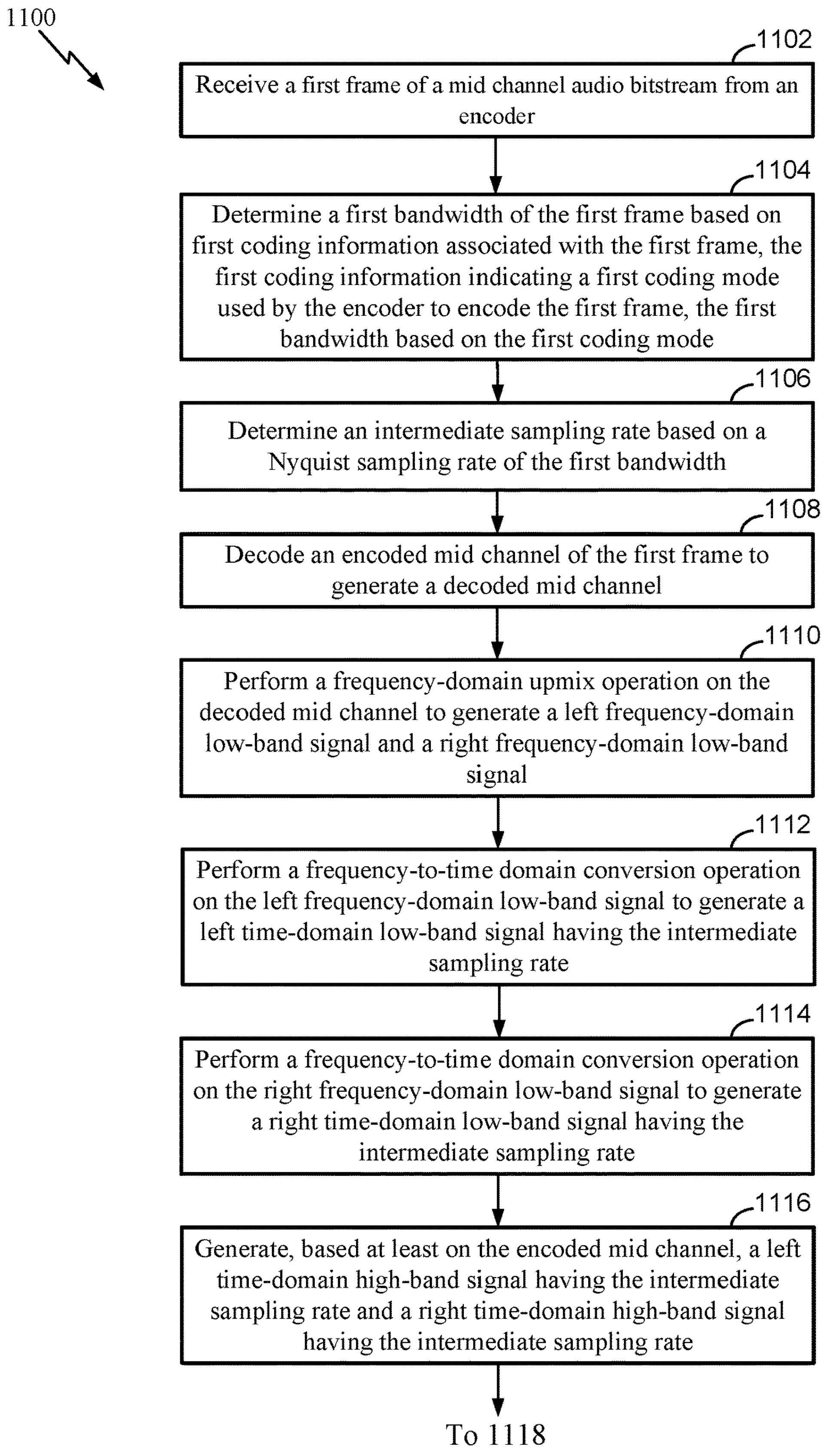
FIGS. 11A-11B depict a method for decoding a frame using an intermediate sampling rate associated with a coding mode of the frame.
Figure 11B:
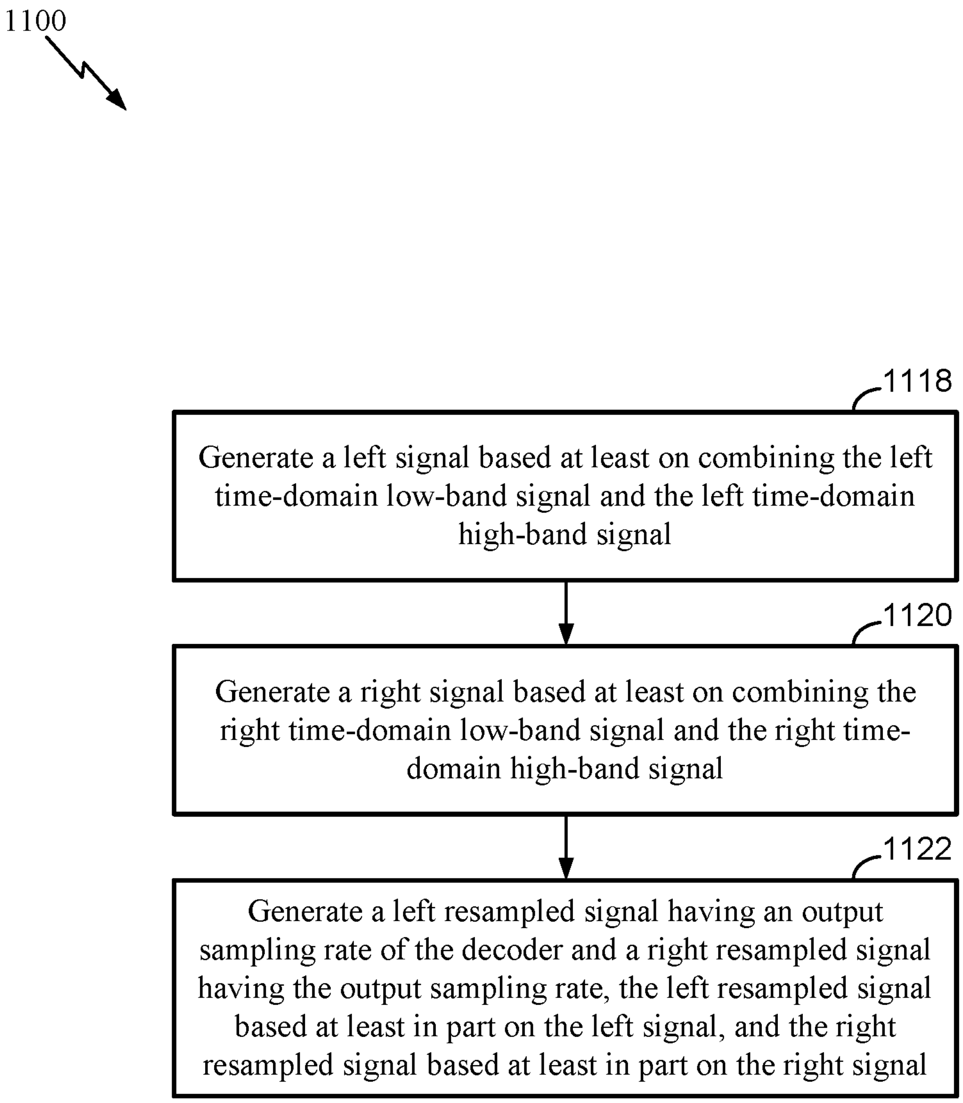

Referring to FIGS. 11A-11B, a method 1100 of processing a signal is shown. The method 1100 may be performed by the decoder 118 of FIG. 1, the system 200 of FIG. 2, the low-band decoder 206 of FIG. 3, the high-band decoder 208 of FIG. 3, the system 600 of FIG. 6, the full-band decoder 608 of FIG. 7, the system 900 of FIG. 9, or a combination thereof.

The method 1100 includes receiving a first frame of a mid channel audio bitstream from an encoder, at 1102. For example, referring to FIG. 9, the mid channel decoder 902 may receive the first frame 915 of the mid-band bitstream 166 (e.g., the mid-band bitstream 166).

The method 1100 also includes determining a first bandwidth of the first frame based on first coding information associated with the first frame, at 1104. The first coding information may indicate a first coding mode used by the encoder to encode the first frame, and the first bandwidth may be based on the first coding mode. For example, referring to FIGS. 1 and 9, the intermediate sampling rate determination circuitry 172 may determine the first bandwidth of the first frame 915 based on the first coding information 916 associated with the first frame 915.

The method 1100 also includes determining an intermediate sampling rate based on a Nyquist sampling rate of the first bandwidth, at 1106. For example, referring to FIGS. 1 and 9, the intermediate sampling rate determination circuitry 172 may determine the first intermediate sampling rate based on the Nyquist sampling rate of the first bandwidth.

The method 1100 also includes decoding an encoded mid channel of the first frame to generate a decoded mid channel, at 1108. For example, referring to FIG. 9, the mid channel decoder 902 may decode the first encoded mid channel of the first frame 915 to generate the first decoded mid channel 920 having the first intermediate sampling rate, and the transform unit 904 may perform the time-to-frequency domain conversion operation on the first decoded mid channel 920 to generate the first frequency-domain decoded mid channel 922 having the first intermediate sampling rate.

The method 1100 also includes performing a frequency-domain upmix operation on the decoded mid channel to generate a left frequency-domain low-band signal and a right frequency-domain low-band signal, at 1110. For example, referring to FIG. 9, the upmixer 906 may perform the frequency-domain upmix operation on the first frequency-domain decoded mid channel 922 to generate the first left frequency-domain low-band channel 924 having the first intermediate sampling rate and the first right frequency-domain low-band channel 926 having the first intermediate sampling rate. For example, the upmixer 906 may use one or more of the stereo cues 162 to perform the frequency-domain upmix operation on the first frequency-domain decoded mid channel 922.

The method 1100 also includes performing a frequency-to-time domain conversion operation on the left frequency-domain low-band signal to generate a left time-domain low-band signal having the intermediate sampling rate, at 1112. For example, referring to FIG. 9, the inverse transform unit 908 may perform the frequency-to-time domain conversion operation on the first left frequency-domain low-band channel 924 to generate the first left time-domain low-band channel 928 having the first intermediate sampling rate. The method 1100 also includes performing a frequency-to-time domain conversion operation on the right frequency-domain low-band signal to generate a right time-domain low-band signal having the first intermediate sampling rate, at 1114. For example, referring to FIG. 9, the inverse transform unit 908 may perform the frequency-to-time domain conversion operation on the first right frequency-domain low-band channel 926 to generate the first right time-domain low-band channel 930 having the first intermediate sampling rate. As described herein, some implementations of a "frequency-to-time domain conversion operation" may include a windowing operation and an overlap-add operation. The left time-domain low-band signal and the right time-domain low-band signal may also be referred to as low-band signals having the intermediate sampling rate.

The method 1100 also includes generating, based at least on the encoded mid channel, a left time-domain high-band signal having the intermediate sampling rate and a right time-domain high-band signal having the intermediate sampling rate, at 1116. For example, referring to FIG. 9, the mid channel decoder 902 may generate the first mid channel excitation 932 having the first intermediate sampling rate based on the first encoded mid channel of the first frame 915, and the BWE unit 910 may perform a bandwidth extension operation on the first mid channel excitation 932 to generate the first BWE mid channel 933 having the first intermediate sampling rate. The ICBWE unit 912 may generate the first left time-domain high-band channel 934 having the first intermediate sampling rate based on the first BWE mid channel 933 and may generate the first right time-domain high-band channel 936 having the first intermediate sampling rate based on the first BWE mid channel 933.

The method 1100 also includes generating a left signal based at least on combining the left time-domain low-band signal and the left time-domain high-band signal, at 1118. For example, referring to FIG. 9, the first left time-domain low-band channel 928 may be combined with the first left time-domain high-band channel 934 to generate the first left channel 938 having the first intermediate sampling rate. The method 1100 also includes generating a right signal based at least on combining the right time-domain low-band signal and the right time-domain high-band signal, at 1120. For example, referring to FIG. 9, the first right time-domain low-band channel 930 may be combined with the first right time-domain high-band channel 936 to generate the first right channel 940 having the first intermediate sampling rate.

The method 1100 also includes generating a left resampled signal having an output sampling rate of the decoder and a right resampled signal having the output sampling rate, at 1122. The left resampled signal may be based at least in part on the left signal, and the right resampled signal may be based at least in part on the right signal. For example, referring to FIG. 9, the re-sampler 914 may generate the first left resampled channel 942 having the output sampling rate ($f_O$) of the decoder 118 by resampling the first left channel 938 to the output sampling rate. Additionally, the re-sampler 914 may generate the first right resampled channel 944 having the output sampling rate by resampling the first right channel 940 to the output sampling rate.

The method 1100 may enable different frames to be decoded at intermediate sampling rates that are based on sampling rates at which the frames are encoded (e.g., based on sampling rates associated with the coding modes of the frames). Decoding the frames at the intermediate sampling rates (as opposed to the output sampling rate of the decoder) may reduce the amount of sampling and resampling operations. For example, the low-band and the high-band may be processed and combined at the intermediate sampling rates. After the low-band and the high-band are combined, a single sampling operation may be performed to generate a signal at the output sampling rate. These techniques may reduce the number of sampling operations compared to conventional techniques in which the low-band is resampled at the output sampling rate (e.g., a first sampling operation), the high-band is resampled at the output sampling rate (e.g., a second sampling operation), and the resampled signals are combined. Reducing the number of resampling operations may reduce cost and computation complexity.

Figure 12:
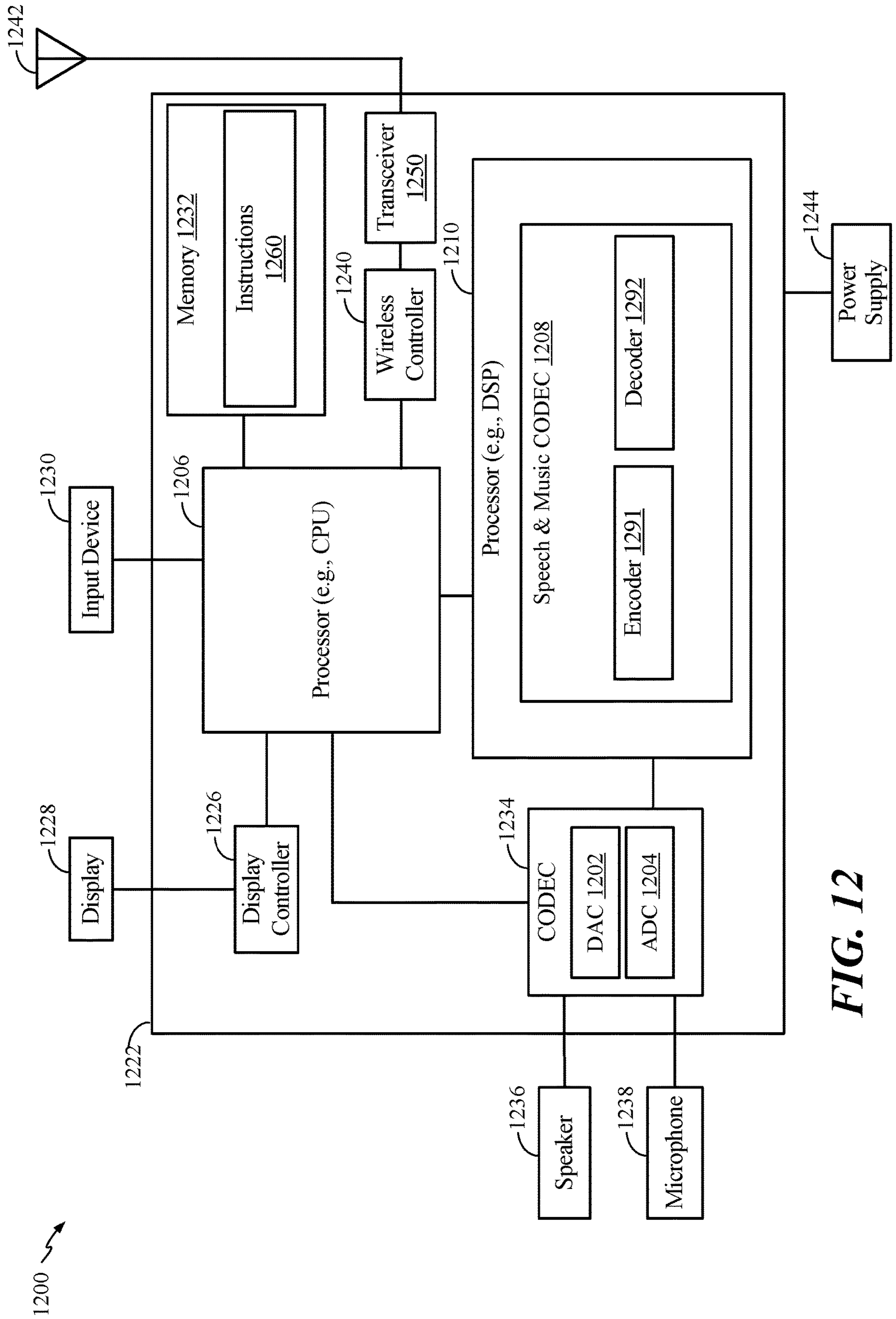
FIG. 12 depicts a device that includes components operable to decode a frame using an intermediate sampling rate associated with a coding mode of the frame.

Referring to FIG. 12, a block diagram of a particular illustrative example of a device (e.g., a wireless communication device) is depicted and generally designated 1200. In various implementations, the device 1200 may have more or fewer components than illustrated in FIG. 12. In an illustrative example, the device 1200 may correspond to the system of FIG. 1. For example, the device 1200 may correspond to the first device 104 or the second device 106 of FIG. 1. In an illustrative example, the device 1200 may operate according to the methods 800, 850 of FIGS. 8A-8B or the method 1100 of FIGS. 11A-11B.

In a particular implementation, the device 1200 includes a processor 1206 (e.g., a CPU). The device 1200 may include one or more additional processors, such as a processor 1210 (e.g., a DSP). The processor 1210 may include a CODEC 1208, such as a speech CODEC, a music CODEC, or a combination thereof. The processor 1210 may include one or more components (e.g., circuitry) configured to perform operations of the speech/music CODEC 1208. As another example, the processor 1210 may be configured to execute one or more computer-readable instructions to perform the operations of the speech/music CODEC 1208. Thus, the CODEC 1208 may include hardware and software. Although the speech/music CODEC 1208 is illustrated as a component of the processor 1210, in other examples one or more components of the speech/music CODEC 1208 may be included in the processor 1206, a CODEC 1234, another processing component, or a combination thereof.

The speech/music CODEC 1208 may include a decoder 1292, such as a vocoder decoder. For example, the decoder 1292 may correspond to the decoder 118 of FIG. 1, the system 200 of FIG. 2, the system 600 of FIG. 6, the system 900 of FIG. 9, or a combination thereof. In a particular implementation, the decoder 1292 is configured to decode frames using intermediate sampling rates associated with coding modes of the frames. The speech/music CODEC 1208 may include an encoder 1291, such as the encoder 114 of FIG. 1.

The device 1200 may include a memory 1232 and the CODEC 1234. The CODEC 1234 may include a digital-to-analog converter (DAC) 1202 and an analog-to-digital converter (ADC) 1204. A speaker 1236, a microphone 1238 (e.g., a microphone array 1238), or both may be coupled to the CODEC 1234. The CODEC 1234 may receive analog signals from the microphone array 1238, convert the analog signals to digital signals using the analog-to-digital converter 1204, and provide the digital signals to the speech/music CODEC 1208. The speech/music CODEC 1208 may process the digital signals. In some implementations, the speech/music CODEC 1208 may provide digital signals to the CODEC 1234. The CODEC 1234 may convert the digital signals to analog signals using the digital-to-analog converter 1202 and may provide the analog signals to the speaker 1236.

The device 1200 may include a wireless controller 1240 coupled, via a transceiver 1250 (e.g., a transmitter, a receiver, or both), to an antenna 1242. The device 1200 may include the memory 1232, such as a computer-readable storage device. The memory 1232 may include instructions 1260, such as one or more instructions that are executable by the processor 1206, the processor 1210, or a combination thereof, to perform one or more of the techniques described with respect to FIGS. 1-7, 9, 10, the methods 800, 850 of FIGS. 8A-8B, the method 1100 of FIGS. 11A-11B, or a combination thereof.

The memory 1232 may include instructions 1260 executable by the processor 1206, the processor 1210, the CODEC 1234, another processing unit of the device 1200, or a combination thereof, to perform methods and processes disclosed herein. One or more components of the system 100 of FIG. 1 may be implemented via dedicated hardware (e.g., circuitry), by a processor executing instructions (e.g., the instructions 1260) to perform one or more tasks, or a combination thereof. As an example, the memory 1232 or one or more components of the processor 1206, the processor 1210, the CODEC 1234, or a combination thereof, may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 1260) that, when executed by a computer (e.g., a processor in the CODEC 1234, the processor 1206, the processor 1210, or a combination thereof), may cause the computer to perform at least a portion of the methods 800, 850 of FIGS. 8A-8B, or the method 1100 of FIGS. 11A-11B.

In a particular implementation, the device 1200 may be included in a system-in-package or system-on-chip device 1222. In some implementations, the memory 1232, the processor 1206, the processor 1210, the display controller 1226, the CODEC 1234, the wireless controller 1240, and the transceiver 1250 are included in a system-in-package or system-on-chip device 1222. In some implementations, an input device 1230 and a power supply 1244 are coupled to the system-on-chip device 1222. Moreover, in a particular implementation, as illustrated in FIG. 12, the display 1228, the input device 1230, the speaker 1236, the microphone array 1238, the antenna 1242, and the power supply 1244 are external to the system-on-chip device 1222. In other implementations, each of the display 1228, the input device 1230, the speaker 1236, the microphone array 1238, the antenna 1242, and the power supply 1244 may be coupled to a component of the system-on-chip device 1222, such as an interface or a controller of the system-on-chip device 1222.

In an illustrative example, the device 1200 corresponds to a mobile device, a communication device, a mobile communication device, a smartphone, a cellular phone, a laptop computer, a computer, a tablet computer, a personal digital assistant, a set top box, a display device, a television, a gaming console, a music player, a radio, a digital video player, a digital video disc (DVD) player, an optical disc player, a tuner, a camera, a navigation device, a decoder system, an encoder system, a base station, a vehicle, or any combination thereof.

In conjunction with the described implementations, an apparatus for processing a signal may include means for receiving a first frame of an input audio bitstream. The first frame may include at least a low-band signal associated with a first frequency range and a high-band signal associated with a second frequency range. For example, the means for receiving the first frame may include the decoder 118 of FIG. 1, the demultiplexer 202 of FIGS. 2 and 6, the decoder 1292 of FIG. 12, one or more other structures, devices, circuits, or a combination thereof.

The apparatus may also include means for decoding the low-band signal to generate a decoded low-band signal having an intermediate sampling rate. The intermediate sampling rate may be based on coding information associated with the first frame. For example, the means for decoding the low-band signal may include the decoder 118 of FIG. 1, the low-band decoder 206 of FIGS. 2, 3, and 6, the mid channel decoder 902 of FIG. 9, the decoder 1292 of FIG. 12, one or more other structures, devices, circuits, or a combination thereof.

The apparatus may also include means for decoding the high-band signal to generate a decoded high-band signal having the intermediate sampling rate. For example, the means for decoding the high-band signal include the decoder 118 of FIG. 1, the high-band decoder 208 of FIGS. 2, 3, and 6, the mid channel decoder 902 of FIG. 9, the BWE unit 910 of FIG. 9, the ICBWE unit 912 of FIG. 9, the decoder 1292 of FIG. 12, one or more other structures, devices, circuits, or a combination thereof.

The apparatus may also include means for combining at least the decoded low-band signal and the decoded high-band signal to generate a combined signal having the intermediate sampling rate. For example, the means for combining may include the decoder 118 of FIG. 1, the adder 210 of FIGS. 2, 3, and 6, the adders of FIG. 9, the decoder 1292 of FIG. 12, one or more other structures, devices, circuits, or a combination thereof.

The apparatus may also include means for generating a resampled signal based at least in part on the combined signal. The resampled signal may have an output sampling rate of a decoder. For example, the means for generating the resampled signal may include the decoder 118 of FIG. 1, the post-processing circuitry 212 of FIGS. 2 and 6, the sampler 214 of FIGS. 2 and 6, the re-sampler 914 of FIG. 9, the decoder 1292 of FIG. 12, one or more other structures, devices, circuits, or a combination thereof.

In conjunction with the described implementations, a second apparatus may include means for receiving a first frame of a mid channel audio bitstream from an encoder. For example, the means for receiving the first frame may include the mid channel decoder 902 of FIG. 9, the decoder 118 of FIG. 1, the demultiplexer 202 of FIGS. 2 and 6, the decoder 1292 of FIG. 12, one or more other structures, devices, circuits, or a combination thereof.

The second apparatus may also include means for determining a first bandwidth of the first frame based on first coding information associated with the first frame. The first coding information may indicate a first coding mode used by the encoder to encode the first frame, and the first bandwidth may be based on the first coding mode. For example, the means for determining the first bandwidth may include the intermediate sampling rate determination circuitry 172 of FIG. 1, the decoder 118 of FIG. 1, the decoder 1292 of FIG. 12, one or more other structures, devices, circuits, or a combination thereof.

The second apparatus may also include means for determining an intermediate sampling rate based on a Nyquist sampling rate of the first bandwidth. For example, the means for determining the intermediate sampling rate may include the intermediate sampling rate determination circuitry 172 of FIG. 1, the decoder 118 of FIG. 1, the decoder 1292 of FIG. 12, one or more other structures, devices, circuits, or a combination thereof.

The second apparatus may also include means for decoding an encoded mid channel of the first frame to generate a decoded mid channel. For example, the means for decoding the encoded mid channel may include the decoder 118 of FIG. 1, the low-band decoder 206 of FIGS. 2, 3, and 6, the mid channel decoder 902 of FIG. 9, the transform unit 904 of FIG. 9, the decoder 1292 of FIG. 12, one or more other structures, devices, circuits, or a combination thereof.

The second apparatus may also include means for performing a frequency-domain upmix operation on the decoded mid channel to generate a left frequency-domain low-band signal and a right frequency-domain low-band signal. For example, the means for performing the frequency-domain upmix operation may include upmixer 906 of FIG. 9, the decoder 1292 of FIG. 12, one or more other structures, devices, circuits, or a combination thereof.

The second apparatus may also include means for performing a frequency-to-time domain conversion operation on the left frequency-domain low-band signal to generate a left time-domain low-band signal having the intermediate sampling rate. For example, the means for performing the frequency-to-time domain conversion operation may include inverse transform unit 908 of FIG. 9, the decoder 1292 of FIG. 12, one or more other structures, devices, circuits, or a combination thereof.

The second apparatus may also include means for performing a frequency-to-time domain conversion operation on the right frequency-domain low-band signal to generate a right time-domain low-band signal having the intermediate sampling rate. For example, the means for performing the frequency-to-time domain conversion operation may include the inverse transform unit 908 of FIG. 9, the decoder 1292 of FIG. 12, one or more other structures, devices, circuits, or a combination thereof.

The second apparatus may also include means for generating, based at least on the encoded mid channel, a left time-domain high-band signal having the intermediate sampling rate and a right time-domain high-band signal having the intermediate sampling rate. For example, the means for generating the left time-domain high-band signal and the right time-domain high-band signal may include the decoder 118 of FIG. 1, the high-band decoder 208 of FIGS. 2, 3, and 6, the mid channel decoder 902 of FIG. 9, the BWE unit 910 of FIG. 9, the ICBWE unit 912 of FIG. 9, the decoder 1292 of FIG. 12, one or more other structures, devices, circuits, or a combination thereof.

The second apparatus may also include means for generating a left signal based at least on combining the left time-domain low-band signal and the left time-domain high-band signal. For example, the means for generating the left signal may include the decoder 118 of FIG. 1, the adder 210 of FIGS. 2, 3, and 6, the adders of FIG. 9, the decoder 1292 of FIG. 12, one or more other structures, devices, circuits, or a combination thereof.

The second apparatus may also include means for generating a right signal based at least on combining the right time-domain low-band signal and the right time-domain high-band signal. For example, the means for generating the right signal may include the decoder 118 of FIG. 1, the adder 210 of FIGS. 2, 3, and 6, the adders of FIG. 9, the decoder 1292 of FIG. 12, one or more other structures, devices, circuits, or a combination thereof.

The second apparatus may also include means for generating a left resampled signal having an output sampling rate of the decoder and a right resampled signal having the output sampling rate. The left resampled signal may be based at least in part on the left signal, and the right resampled signal may be based at least in part on the right signal. For example, the means for generating the left resampled signal and the right resampled signal may include the decoder 118 of FIG. 1, the post-processing circuitry 212 of FIGS. 2 and 6, the sampler 214 of FIGS. 2 and 6, the re-sampler 914 of FIG. 9, the decoder 1292 of FIG. 12, one or more other structures, devices, circuits, or a combination thereof.

Figure 13:
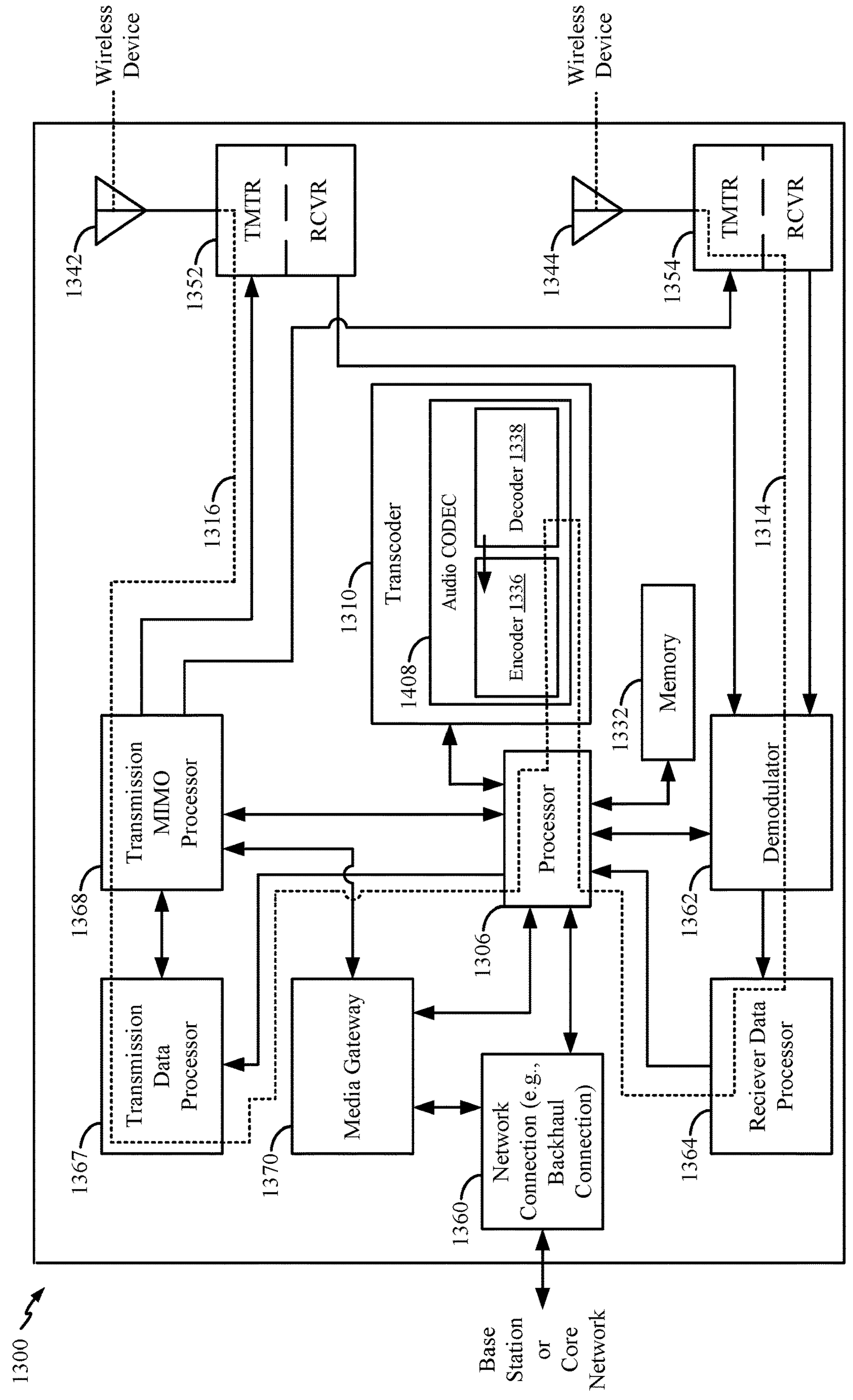
FIG. 13 depicts a base station that includes components operable to decode a frame using an intermediate sampling rate associated with a coding mode of the frame.

Referring to FIG. 13, a block diagram of a particular illustrative example of a base station 1300 is depicted. In various implementations, the base station 1300 may have more components or fewer components than illustrated in FIG. 13. In an illustrative example, the base station 1300 may include the system 100 of FIG. 1. In an illustrative example, the base station 1300 may operate according to the methods 800, 850 of FIGS. 8A-8B or the method 1100 of FIGS. 11A-11B.

The base station 1300 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 1200 of FIG. 12.

Various functions may be performed by one or more components of the base station 1300 (and/or in other components not shown), such as sending and receiving messages and data (e.g., audio data). In a particular example, the base station 1300 includes a processor 1306 (e.g., a CPU). The base station 1300 may include a transcoder 1310. The transcoder 1310 may include an audio CODEC 1308. For example, the transcoder 1310 may include one or more components (e.g., circuitry) configured to perform operations of the audio CODEC 1308. As another example, the transcoder 1310 may be configured to execute one or more computer-readable instructions to perform the operations of the audio CODEC 1308. Although the audio CODEC 1308 is illustrated as a component of the transcoder 1310, in other examples one or more components of the audio CODEC 1308 may be included in the processor 1306, another processing component, or a combination thereof. For example, a vocoder decoder 1338 may be included in a receiver data processor 1364. As another example, a vocoder encoder 1336 may be included in a transmission data processor 1367. In a particular implementation, the vocoder decoder 1338 may include or correspond to the decoder 118 of FIG. 1, the system 200 of FIG. 2, the low-band decoder 206 of FIG. 3, the high-band decoder 208 of FIG. 3, the system 600 of FIG. 6, the full-band decoder 608 of FIG. 7, the system 900 of FIG. 9, or a combination thereof, as non-limiting examples.

The transcoder 1310 may function to transcode messages and data between two or more networks. The transcoder 1310 may be configured to convert message and audio data from a first format (e.g., a digital format) to a second format. To illustrate, the vocoder decoder 1338 may decode encoded signals having a first format and the vocoder encoder 1336 may encode the decoded signals into encoded signals having a second format. Additionally or alternatively, the transcoder 1310 may be configured to perform data rate adaptation. For example, the transcoder 1310 may downconvert a data rate or upconvert the data rate without changing a format the audio data. To illustrate, the transcoder 1310 may downconvert 64 kbit/s signals into 16 kbit/s signals.

The audio CODEC 1308 may include the vocoder encoder 1336 and the vocoder decoder 1338. The vocoder encoder 1336 may include an encode selector, a speech encoder, and a music encoder. The vocoder decoder 1338 may include a decoder selector, a speech decoder, and a music decoder.

The base station 1300 may include a memory 1332. The memory 1332, such as a computer-readable storage device, may include instructions. The instructions may include one or more instructions that are executable by the processor 1306, the transcoder 1310, or a combination thereof, to perform the methods 800, 850 of FIGS. 8A-8B. The base station 1300 may include multiple transmitters and receivers (e.g., transceivers), such as a first transceiver 1352 and a second transceiver 1354, coupled to an array of antennas. The array of antennas may include a first antenna 1342 and a second antenna 1344. The array of antennas may be configured to wirelessly communicate with one or more wireless devices, such as the device 1200 of FIG. 12. For example, the second antenna 1344 may receive a data stream 1314 (e.g., a bit stream) from a wireless device. The data stream 1314 may include messages, data (e.g., encoded speech data), or a combination thereof.

The base station 1300 may include a network connection 1360, such as backhaul connection. The network connection 1360 may be configured to communicate with a core network or one or more base stations of the wireless communication network. For example, the base station 1300 may receive a second data stream (e.g., messages or audio data) from a core network via the network connection 1360. The base station 1300 may process the second data stream to generate messages or audio data and provide the messages or the audio data to one or more wireless device via one or more antennas of the array of antennas or to another base station via the network connection 1360. In a particular implementation, the network connection 1360 may be a wide area network (WAN) connection, as an illustrative, non-limiting example. In some implementations, the core network may include or correspond to a Public Switched Telephone Network (PSTN), a packet backbone network, or both.

The base station 1300 may include a media gateway 1370 that is coupled to the network connection 1360 and the processor 1306. The media gateway 1370 may be configured to convert between media streams of different telecommunications technologies. For example, the media gateway 1370 may convert between different transmission protocols, different coding schemes, or both. To illustrate, the media gateway 1370 may convert from PCM signals to Real-Time Transport Protocol (RTP) signals, as an illustrative, non-limiting example. The media gateway 1370 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 1370 may include a transcoder, such as the transcoder 1310, and may be configured to transcode data when codecs are incompatible. For example, the media gateway 1370 may transcode between an Adaptive Multi-Rate (AMR) codec and a G.711 codec, as an illustrative, non-limiting example. The media gateway 1370 may include a router and a plurality of physical interfaces. In some implementations, the media gateway 1370 may also include a controller (not shown). In a particular implementation, the media gateway controller may be external to the media gateway 1370, external to the base station 1300, or both. The media gateway controller may control and coordinate operations of multiple media gateways. The media gateway 1370 may receive control signals from the media gateway controller and may function to bridge between different transmission technologies and may add service to end-user capabilities and connections.

The base station 1300 may include a demodulator 1362 that is coupled to the transceivers 1352, 1354, the receiver data processor 1364, and the processor 1306, and the receiver data processor 1364 may be coupled to the processor 1306. The demodulator 1362 may be configured to demodulate modulated signals received from the transceivers 1352, 1354 and to provide demodulated data to the receiver data processor 1364. The receiver data processor 1364 may be configured to extract a message or audio data from the demodulated data and send the message or the audio data to the processor 1306.

The base station 1300 may include a transmission data processor 1367 and a transmission multiple input-multiple output (MIMO) processor 1368. The transmission data processor 1367 may be coupled to the processor 1306 and the transmission MIMO processor 1368. The transmission MIMO processor 1368 may be coupled to the transceivers 1352, 1354 and the processor 1306. In some implementations, the transmission MIMO processor 1368 may be coupled to the media gateway 1370. The transmission data processor 1367 may be configured to receive the messages or the audio data from the processor 1306 and to code the messages or the audio data based on a coding scheme, such as CDMA or orthogonal frequency-division multiplexing (OFDM), as an illustrative, non-limiting examples. The transmission data processor 1367 may provide the coded data to the transmission MIMO processor 1368.

The coded data may be multiplexed with other data, such as pilot data, using CDMA or OFDM techniques to generate multiplexed data. The multiplexed data may then be modulated (i.e., symbol mapped) by the transmission data processor 1367 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 1306.

The transmission MIMO processor 1368 may be configured to receive the modulation symbols from the transmission data processor 1367 and may further process the modulation symbols and may perform beamforming on the data. For example, the transmission MIMO processor 1368 may apply beamforming weights to the modulation symbols. The beamforming weights may correspond to one or more antennas of the array of antennas from which the modulation symbols are transmitted.

During operation, the second antenna 1344 of the base station 1300 may receive a data stream 1314. The second transceiver 1354 may receive the data stream 1314 from the second antenna 1344 and may provide the data stream 1314 to the demodulator 1362. The demodulator 1362 may demodulate modulated signals of the data stream 1314 and provide demodulated data to the receiver data processor 1364. The receiver data processor 1364 may extract audio data from the demodulated data and provide the extracted audio data to the processor 1306.

The processor 1306 may provide the audio data to the transcoder 1310 for transcoding. The vocoder decoder 1338 of the transcoder 1310 may decode the audio data from a first format into decoded audio data and the vocoder encoder 1336 may encode the decoded audio data into a second format. In some implementations, the vocoder encoder 1336 may encode the audio data using a higher data rate (e.g., upconvert) or a lower data rate (e.g., downconvert) than received from the wireless device. In other implementations the audio data may not be transcoded. Although transcoding (e.g., decoding and encoding) is illustrated as being performed by a transcoder 1310, the transcoding operations (e.g., decoding and encoding) may be performed by multiple components of the base station 1300. For example, decoding may be performed by the receiver data processor 1364 and encoding may be performed by the transmission data processor 1367. In other implementations, the processor 1306 may provide the audio data to the media gateway 1370 for conversion to another transmission protocol, coding scheme, or both. The media gateway 1370 may provide the converted data to another base station or core network via the network connection 1360.

The vocoder decoder 1338, the vocoder encoder 1336, or both may receive the parameter data and may identify the parameter data on a frame-by-frame basis. The vocoder decoder 1338, the vocoder encoder 1336, or both may classify, on a frame-by-frame basis, the synthesized signal based on the parameter data. The synthesized signal may be classified as a speech signal, a non-speech signal, a music signal, a noisy speech signal, a background noise signal, or a combination thereof. The vocoder decoder 1338, the vocoder encoder 1336, or both may select a particular decoder, encoder, or both based on the classification. Encoded audio data generated at the vocoder encoder 1336, such as transcoded data, may be provided to the transmission data processor 1367 or the network connection 1360 via the processor 1306.

The transcoded audio data from the transcoder 1310 may be provided to the transmission data processor 1367 for coding according to a modulation scheme, such as OFDM, to generate the modulation symbols. The transmission data processor 1367 may provide the modulation symbols to the transmission MIMO processor 1368 for further processing and beamforming. The transmission MIMO processor 1368 may apply beamforming weights and may provide the modulation symbols to one or more antennas of the array of antennas, such as the first antenna 1342 via the first transceiver 1352. Thus, the base station 1300 may provide a transcoded data stream 1316, that corresponds to the data stream 1314 received from the wireless device, to another wireless device. The transcoded data stream 1316 may have a different encoding format, data rate, or both, than the data stream 1314. In other implementations, the transcoded data stream 1316 may be provided to the network connection 1360 for transmission to another base station or a core network.

The base station 1300 may therefore include a computer-readable storage device (e.g., the memory 1332) storing instructions that, when executed by a processor (e.g., the processor 1306 or the transcoder 1310), cause the processor to perform operations including receiving a first frame of an input audio bitstream, the first frame including at least a low-band signal associated with a first frequency range and a high-band signal associated with a second frequency range, decoding the low-band signal to generate a decoded low-band signal having an intermediate sampling rate, the intermediate sampling rate based on coding information associated with the first frame, decoding the high-band signal to generate a decoded high-band signal having the intermediate sampling rate, combining at least the decoded low-band signal and the decoded high-band signal to generate a combined signal having the intermediate sampling rate, and generating a resampled signal based at least in part on the combined signal, the resampled signal having an output sampling rate of the decoder.

In the implementations of the description described above, various functions performed have been described as being performed by certain components or modules, such as components or module of the system 100 of FIG. 1. However, this division of components and modules is for illustration only. In alternative examples, a function performed by a particular component or module may instead be divided amongst multiple components or modules. Moreover, in other alternative examples, two or more components or modules of FIG. 1 may be integrated into a single component or module. Each component or module illustrated in FIG. 1 may be implemented using hardware (e.g., an ASIC, a DSP, a controller, a FPGA device, etc.), software (e.g., instructions executable by a processor), or any combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be included directly in hardware, in a software module executed by a processor, or in a combination of the two. A software module may reside in RAM, flash memory, ROM, PROM, EPROM, EEPROM, registers, hard disk, a removable disk, a CD-ROM, or any other form of non-transient storage medium known in the art. A particular storage medium may be coupled to the processor such that the processor may read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. An apparatus comprising:

a decoder coupled to a receiver and configured to:

receive a frame of an audio bitstream from the receiver, the frame associated with a first sampling rate;

determine a second sampling rate based on one or both of the first sampling rate and an output sampling rate;

based on data associated with the frame, generate a left time-domain signal and a right time-domain signal, each of the left time-domain signal and the right time-domain signal having the second sampling rate; and based on the left time-domain signal and the right time-domain signal, generate a left resampled signal and a right resampled signal, each of the left resampled signal and the right resampled signal having the output sampling rate.

2. The apparatus of claim 1, wherein the second sampling rate is adjustable by the decoder to enable different frames to be decoded at different second sampling rates, and wherein the decoder is further configured to determine the second sampling rate to be equal to the first sampling rate based on determining that the first sampling rate is less than the output sampling rate and to be equal to the output sampling rate based on determining that the output sampling rate is less than or equal to the first sampling rate.

3. The apparatus of claim 1, wherein the decoder is further configured to generate the data by decoding an encoded mid channel of the frame and to perform a frequency-domain upmix on the decoded mid channel to generate a left frequency-domain signal and a right frequency-domain signal, and wherein:

the audio bitstream is a mid channel audio bitstream from an encoder, the first sampling rate is a Nyquist sampling rate of a bandwidth of the frame, the bandwidth is based on a coding mode associated with the frame, the second sampling rate is an intermediate sampling rate determined at the decoder based on the Nyquist sampling rate, and the left time-domain signal and the right time-domain signal are based on the left frequency-domain signal and the right frequency-domain signal.

4. The apparatus of claim 1, wherein the decoder is further configured to:

generate, based on an encoded mid channel of the frame, a left time-domain high-band signal and a right time-domain high-band signal, each of the left time-domain high-band signal and the right time-domain high-band signal having the second sampling rate;

generate a left signal based on combining the left time-domain signal and the left time-domain high-band signal; and generate a right signal based on combining the right time-domain signal and the right time-domain high-band signal.

5. The apparatus of claim 4, wherein the decoder is configured to generate the left resampled signal and the right resampled signal based on the left signal and the right signal.

6. The apparatus of claim 4, wherein:

the decoder is further configured to perform decoding operations on an encoded mid channel of the audio bitstream to generate a left time-domain full-band signal and a right time-domain full-band signal, and the left time-domain full-band signal and the right time-domain full-band signal are combined with the left time-domain signal and the right time-domain signal and the left time-domain high-band signal and the right time-domain high-band signal to generate the left signal and the right signal.

7. The apparatus of claim 1, wherein the decoder is further configured to perform a frequency-domain upmix based on the data to generate a left frequency-domain signal and a right frequency-domain signal, wherein the frequency-domain upmix comprises a Discrete Fourier Transform (DFT) upmix operation, and wherein the left time-domain signal and the right time-domain signal are based on the left frequency-domain signal and the right frequency-domain signal.

8. The apparatus of claim 1, wherein the frame is associated with a coding mode, and wherein the coding mode includes a Wideband coding mode, a Super-Wideband coding mode, or a Full-band coding mode.

9. The apparatus of claim 1, wherein the audio bitstream includes a mid channel audio bitstream from an encoder, wherein the decoder is further configured to determine a maximum bandwidth of the mid channel audio bitstream and to perform a frequency-domain upmix on the data to generate a left frequency-domain signal and a right frequency-domain signal, wherein the left time-domain signal and the right time-domain signal are based on the left frequency-domain signal and the right frequency-domain signal, and wherein the frequency-domain upmix is based on the determined maximum bandwidth.

10. The apparatus of claim 1, wherein the receiver and the decoder are integrated into a device that comprises a mobile device or a base station.

11. A method for processing a signal at a decoder, the method comprising:

receiving a frame of an audio bitstream from a receiver, the frame associated with a first sampling rate;

based on data associated with the frame, generating a left time-domain signal and a right time-domain signal, each of the left time-domain signal and the right time-domain signal having a second sampling rate, wherein the second sampling rate is adjustable by the decoder to enable different frames to be decoded using different second sampling rates; and based on the left time-domain signal and right time-domain signal, generating a left resampled signal and a right resampled signal, each of the left resampled signal and the right resampled signal having an output sampling rate.

12. The method of claim 11, further comprising determining, at the decoder, the second sampling rate based on the output sampling rate and the first sampling rate, wherein the second sampling rate is determined to be equal to the first sampling rate based on determining that the first sampling rate is less than the output sampling rate and to be equal to the output sampling rate based on determining that the output sampling rate is less than or equal to the first sampling rate.

13. The method of claim 11, further comprising performing a frequency-domain upmix on a decoded mid channel of the frame to generate a left frequency-domain signal and a right frequency-domain signal, wherein:

the audio bitstream includes a mid channel audio bitstream received from an encoder, the first sampling rate is a Nyquist sampling rate of a bandwidth of the frame, the bandwidth is based on a coding mode associated with the frame, the second sampling rate is an intermediate sampling rate determined at the decoder based on the Nyquist sampling rate, and the left time-domain signal and the right time-domain signal are based on the left frequency-domain signal and the right frequency-domain signal.

14. The method of claim 11, further comprising generating a left time-domain high-band signal and a right time-domain high-band signal, the left time-domain high-band signal and the right time-domain high-band signal generated based on an encoded mid channel of the frame and each of the left time-domain high-band signal and the right time-domain high-band signal having the second sampling rate.

15. The method of claim 14, further comprising combining the left time-domain signal and the right time-domain signal and the left time-domain high-band signal and the right time-domain high-band signal to generate a left signal and a right signal, wherein the left resampled signal and the right resampled signal are based on the left signal and the right signal.

16. The method of claim 14, further comprising:

performing decoding operations on an encoded mid channel of the audio bitstream to generate a left time-domain full-band signal and a right time-domain full-band signal, and combining the left time-domain full-band signal and the right time-domain full-band signal, the left time-domain signal and the right time-domain signal, and the left time-domain high-band signal and the right time-domain high-band signal to generate a left signal and a right signal, wherein the left resampled signal and the right resampled signal are based on the left signal and the right signal.

17. The method of claim 11, further comprising performing a frequency-domain upmix on a decoded mid channel of the frame to generate a left frequency-domain signal and a right frequency-domain signal, wherein the left time-domain signal and the right time-domain signal are based on the left frequency-domain signal and the right frequency-domain signal, and wherein the frequency-domain upmix includes a Discrete Fourier Transform (DFT) upmix operation.

18. The method of claim 11, wherein the frame is associated with a coding mode, and wherein the coding mode includes a Wideband coding mode, a Super-Wideband coding mode, or a Full-band coding mode.

19. The method of claim 11, wherein the audio bitstream includes a mid channel audio bitstream from an encoder, further comprising:

determining a maximum bandwidth of the mid channel audio bitstream, and performing a frequency-domain upmix on the data to generate a left frequency-domain signal and a right frequency-domain signal, wherein the left time-domain signal and the right time-domain signal are based on the left frequency-domain signal and the right frequency-domain signal, and wherein the frequency-domain upmix is performed based on the determined maximum bandwidth.

20. The method of claim 11, wherein the receiving, the generating of the left time-domain signal and the right time-domain signal, and the generating of the left resampled signal and the right resampled signal are performed in a device that comprises a mobile device or a base station.

21. A non-transitory computer-readable medium comprising instructions for processing a signal, the instructions, when executed by a processor within a decoder, cause the processor to perform operations comprising:

receiving a frame of an audio bitstream from a receiver, the frame associated with a first sampling rate;

determining a second sampling rate based on one or both of the first sampling rate and an output sampling rate, the second sampling rate adjustable by the decoder to enable different frames to be decoded using different second sampling rates;

based on data associated with the frame, generating a left time-domain signal and a right time-domain signal, each of the left time-domain signal and the right time-domain signal having the second sampling rate; and based on the left time-domain signal and the right time-domain signal, generating a left resampled signal and a right resampled signal, each of the left resampled signal and the right resampled signal having the output sampling rate.

22. The non-transitory computer-readable medium of claim 21, wherein the operations further comprise determining the second sampling rate to be equal to the first sampling rate based on determining that the first sampling rate is less than the output sampling rate and to be equal to the output sampling rate based on determining that the output sampling rate is less than or equal to the first sampling rate.

23. The non-transitory computer-readable medium of claim 21, wherein the operations further comprise:

decoding an encoded mid channel of the frame to generate the data; and performing a frequency-domain upmix on the decoded mid channel to generate a left frequency-domain signal and a right frequency-domain signal, and wherein:

the audio bitstream includes a mid channel audio bitstream received from an encoder, the first sampling rate is a Nyquist sampling rate of a bandwidth of the frame, the bandwidth is based on a coding mode associated with the frame, the second sampling rate is an intermediate sampling rate determined at the decoder based on the Nyquist sampling rate, and the left time-domain signal and the right time-domain signal are based on the left frequency-domain signal and the right frequency-domain signal.

24. The non-transitory computer-readable medium of claim 21, wherein the operations further comprise generating a left time-domain high-band signal and a right time-domain high-band signal, the left time-domain high-band signal and the right time-domain high-band signal generated based on an encoded mid channel of the frame and each of the left time-domain high-band signal and the right time-domain high-band signal having the second sampling rate.

25. The non-transitory computer-readable medium of claim 24, wherein the operations further comprise combining the left time-domain signal and the right time-domain signal and the left time-domain high-band signal and the right time-domain high-band signal to generate a left signal and a right signal, wherein the left resampled signal and the right resampled signal are based on the left signal and the right signal.

26. The non-transitory computer-readable medium of claim 24, wherein the operations further comprise:

performing decoding operations on an encoded mid channel of the audio bitstream to generate a left time-domain full-band signal and a right time-domain full-band signal, and combining the left time-domain full-band signal and the right time-domain full-band signal, the left time-domain signal and the right time-domain signal, and the left time-domain high-band signal and the right time-domain high-band signal to generate a left signal and a right signal, wherein the left resampled signal and the right resampled signal are based on the left signal and the right signal.

27. The non-transitory computer-readable medium of claim 21, wherein the data includes a decoded mid channel of the frame, wherein the operations further comprise performing a frequency-domain upmix on the decoded mid channel to generate a left frequency domain signal and a right frequency domain signal, wherein the left time-domain signal and the right time-domain signal are based on the left frequency-domain signal and the right frequency-domain signal, and wherein the frequency-domain upmix includes a Discrete Fourier Transform (DFT) upmix operation.

28. The non-transitory computer-readable medium of claim 21, wherein the frame is associated with a coding mode, and wherein the coding mode includes a Wideband coding mode, a Super-Wideband coding mode, or a Full-band coding mode.

29. The non-transitory computer-readable medium of claim 21, wherein the audio bitstream includes a mid channel audio bitstream from an encoder, wherein the operations further comprise determining a maximum bandwidth of the mid channel audio bitstream, and performing a frequency-domain upmix on the data to generate a left frequency-domain signal and a right frequency-domain signal, wherein the left time-domain signal and the right time-domain signal are based on the left frequency-domain signal and the right frequency-domain signal, and wherein the frequency-domain upmix is performed based on the determined maximum bandwidth.

30. The non-transitory computer-readable medium of claim 21, wherein the processor is integrated into a device that comprises a mobile device or a base station.

* * * * *